United States Patent
Yi et al.

(10) Patent No.: US 12,073,585 B2
(45) Date of Patent: Aug. 27, 2024

(54) POSE ESTIMATION APPARATUS AND METHOD FOR ROBOTIC ARM TO GRASP TARGET BASED ON MONOCULAR INFRARED THERMAL IMAGING VISION

(71) Applicant: CHENGDU UNIVERSITY OF TECHNOLOGY, Chengdu (CN)

(72) Inventors: Shi Yi, Chengdu (CN); Xinghao Cheng, Chengdu (CN); Cheng Wang, Chengdu (CN)

(73) Assignee: CHENGDU UNIVERSITY OF TECHNOLOGY, Chengdu (CN)

( * ) Notice: Subject to any disclaimer, the term of this patent is extended or adjusted under 35 U.S.C. 154(b) by 0 days.

(21) Appl. No.: 18/276,648

(22) PCT Filed: Jan. 30, 2023

(86) PCT No.: PCT/CN2023/073757
§ 371 (c)(1),
(2) Date: Aug. 10, 2023

(65) Prior Publication Data
US 2024/0242377 A1 Jul. 18, 2024

(30) Foreign Application Priority Data
Jan. 9, 2023 (CN) .......................... 202310028374.3

(51) Int. Cl.
*G06T 7/73* (2017.01)
*B25J 9/16* (2006.01)
(Continued)

(52) U.S. Cl.
CPC .............. *G06T 7/73* (2017.01); *B25J 9/1697* (2013.01); *G06V 10/462* (2022.01); *G06V 10/50* (2022.01);
(Continued)

(58) Field of Classification Search
CPC ............. G06T 7/73; G06T 2207/10048; G06T 2207/20064; G06T 2207/20084;
(Continued)

(56) References Cited

U.S. PATENT DOCUMENTS 7,714,895 B2 * 5/2010 Pretlove ................ G06F 3/1454
348/222.1
9,821,458 B1 * 11/2017 Watts ..................... B25J 9/1612
(Continued)

FOREIGN PATENT DOCUMENTS

CN 203266656 U 11/2013
CN 107878584 A 4/2018
(Continued)

OTHER PUBLICATIONS

Liu C., et al., "Vision-based multi-sensor fusion intelligent fireproof robot", machine translation of CN114310961A, published Apr. 12, 2022.*

*Primary Examiner* — Xuemei G Chen
(74) *Attorney, Agent, or Firm* — Bayramoglu Law Offices LLC

(57) ABSTRACT

A pose estimation apparatus and method for a robotic arm to grasp a target based on monocular infrared thermal imaging vision are provided. The pose estimation apparatus includes a monocular infrared thermal imaging camera, a laser ranging module, an edge computing platform, and an embedded processor. The monocular infrared thermal imaging camera can perform imaging based on a temperature difference between a target and an environment in smoke, combustion, and explosion environments in which a specialized robot works. The laser ranging module can assist in measuring a distance of a to-be-grasped target. An algorithm process is deployed on the edge computing platform. The embedded processor completes motion control of a robotic arm.

14 Claims, 9 Drawing Sheets

(51) Int. Cl.
*G06V 10/46* (2022.01)
*G06V 10/50* (2022.01)
*G06V 10/77* (2022.01)
*G06V 10/80* (2022.01)
*G06V 10/82* (2022.01)

(52) U.S. Cl.
CPC ........ *G06V 10/7715* (2022.01); *G06V 10/806* (2022.01); *G06V 10/82* (2022.01); *G06T 2207/10048* (2013.01); *G06T 2207/20064* (2013.01); *G06T 2207/20084* (2013.01); *G06V 2201/07* (2022.01)

(58) Field of Classification Search
CPC ..... B25J 9/1697; G06V 10/462; G06V 10/50; G06V 10/7715; G06V 10/806; G06V 10/82; G06V 2201/07
See application file for complete search history.

(56) References Cited

U.S. PATENT DOCUMENTS

| | | | | |
|---|---|---|---|---|
| 10,482,603 | B1* | 11/2019 | Fu | G06N 3/04 |
| 11,289,192 | B2* | 3/2022 | Wang | G06F 3/04842 |
| 2006/0088203 | A1* | 4/2006 | Boca | G06T 7/80 |
| | | | | 382/153 |
| 2013/0231779 | A1* | 9/2013 | Purkayastha | B25J 9/1697 |
| | | | | 700/258 |
| 2018/0084242 | A1* | 3/2018 | Rublee | G06F 18/22 |
| 2019/0175293 | A1* | 6/2019 | Popovic | A61B 34/30 |
| 2021/0086364 | A1* | 3/2021 | Handa | G06T 1/0014 |
| 2022/0118611 | A1* | 4/2022 | Geissler | B25J 9/1679 |
| 2022/0343537 | A1* | 10/2022 | Taamazyan | G06V 10/82 |
| 2022/0405506 | A1* | 12/2022 | Taamazyan | G06T 7/50 |
| 2023/0071384 | A1* | 3/2023 | Agarwal | B25J 13/089 |
| 2023/0079638 | A1* | 3/2023 | Kim | A61B 90/00 |
| | | | | 700/245 |
| 2024/0083037 | A1* | 3/2024 | Liu | B25J 9/0081 |
| 2024/0085916 | A1* | 3/2024 | Izhikevich | G06V 10/82 |

FOREIGN PATENT DOCUMENTS

| | | | |
|---|---|---|---|
| CN | 211682089 U | | 10/2020 |
| CN | 112454353 A | | 3/2021 |
| CN | 114310961 A | * | 4/2022 |
| KR | 20180086831 A | | 8/2018 |

* cited by examiner

POSE ESTIMATION APPARATUS AND METHOD FOR ROBOTIC ARM TO GRASP TARGET BASED ON MONOCULAR INFRARED THERMAL IMAGING VISION

CROSS REFERENCE TO THE RELATED APPLICATIONS

This application is the national phase entry of International Application No. PCT/CN2023/073757, filed on Jan. 30, 2023, which is based upon and claims priority to Chinese Patent Application No. 202310028374.3, filed on Jan. 9, 2023, the entire contents of which are incorporated herein by reference.

TECHNICAL FIELD

The present disclosure relates to the technical field of communications, and in particular, to a pose estimation apparatus and method for a robotic arm to grasp a target based on monocular infrared thermal imaging vision.

BACKGROUND

A robotic arm mounted on a specialized robot for working in smoke, combustion, explosion, and other environments needs to quickly and accurately grasp a target. Therefore, it is necessary to estimate the target pose and extract a grasping parameter for grasping the target in such harsh imaging environments. The existing pose estimation method and apparatus for grasping a target using the robotic arm generally have the following problems for the above requirement: (1) A visual sensor mounted cannot achieve ideal imaging in a smoke, combustion, or explosion environment. Specifically, target grasping sensors commonly used for the robotic arm in the industry are a monocular visible light (RGB) camera and a binocular depth (RGBD) camera. In a smoke environment at the scene of a fire and in the combustion and explosion environments at a scene of an accident, the visual sensors mentioned above are unable to achieve ideal imaging due to insufficient lighting, high smoke concentration, high dust density, and other factors, which seriously affects subsequent pose estimation of a to-be-grasped target. (2) Framework design of the pose estimation method for grasping the target is complex, which affects real-time performance. Specifically, most current pose estimation methods for grasping the target using the robotic arm use a 6D target pose estimation method to perform pose modeling on the to-be-grasped target. Although this method is characterized by high grasping accuracy, it has a complex framework, high computational complexity, and low real-time performance. Therefore, this method is suitable for a scenario in which the robotic arm automatically performs processing and production in an industrial production line, but not suitable for the specialized robot to quickly grasp the target in a complex environment. (3) The apparatus has a complex structure and is difficult to achieve a lightweight design. Currently, the pose estimation system for grasping a target using a robotic arm in an industrial production environment is usually deployed on a server due to the requirement of the pose estimation system for computing power of a platform, and has a relatively complex electromechanical control apparatus, which is not suitable for the lightweight load requirement of a specialized robot.

A visual perception function of an automatic grasping system of the specialized robot is implemented according to following four steps: target positioning, pose estimation, grasping point detection, and grasping planning. The target positioning and the pose estimation are most crucial. Visual perception sensors used in the existing method and apparatus are usually the monocular visible light (RGB) camera and the binocular depth (RGBD) camera.

Disadvantages of the prior art are as follows:
1. The RGB camera and the RGBD camera mounted on the robotic arm cannot achieve ideal imaging in smoke, combustion, or explosion environments in which the specialized robot works. In the above harsh imaging environments, smoke, flame, dust, and other interference factors seriously affect imaging quality thereof. As a result, the above visual sensors are unable to image normally for a subsequent visual task.
2. In the above scheme, the process of a visual algorithm is too complex. 2D and 3D target detection and segmentation frameworks, and a 6D pose estimation framework often use a deep network to ensure detection, segmentation, and pose estimation accuracy. In addition, there are many positioning and pose modeling processes, resulting in a high computational consumption, poor real-time performance, and difficult model deployment, which is not suitable for a task demand of a special mobile robot.
3. A deployment apparatus has difficulty meeting the lightweight requirement. Because the algorithm process of the existing pose estimation system for grasping the target using the robotic arm is complex, the pose estimation system is generally deployed on an industrial personal computer and a server platform. However, a special mobile robot generally works in a complex environment and narrow space, so a lightweight load is required, and a visual algorithm framework that can be deployed on a lightweight edge computing platform is needed.

SUMMARY

In order to overcome the aforementioned shortcomings in the prior art, the present disclosure provides a pose estimation apparatus and method for a robotic arm to grasp a target based on monocular infrared thermal imaging vision, to resolve a problem that a specialized robot working in smoke, combustion, and explosion environments is unable to estimate a pose of a to-be-grasped target in real-time and automatically grasp the target.

To achieve the above objective, the present disclosure adopts following technical solutions.

The present disclosure provides a pose estimation apparatus for a robotic arm to grasp a target based on monocular infrared thermal imaging vision, where the pose estimation apparatus is mounted on a robotic arm loaded on a specialized robot working in smoke, combustion, and explosion environments, and the pose estimation apparatus includes:
  a monocular infrared thermal imaging camera configured to perform imaging in the smoke, combustion, and explosion environments, and acquire an infrared thermally-imaged visual image;
  a laser ranging module mounted at a bottom of the monocular infrared thermal imaging camera, having a ranging point registered to coincide with a center point of an infrared image, and configured to range a to-be-grasped target;
  an edge computing platform configured to perform detection, positioning, pose estimation, and coordinate parameter extraction on the to-be-grasped target based on an infrared imaged visual image and a ranging result, and plan a motion path of the robotic arm; and an embedded microcontroller configured to generate a control signal based on the planned motion path to control the robotic arm to grasp the target.

The present disclosure further provides an estimation method for a pose estimation apparatus for a robotic arm to grasp a target based on monocular infrared thermal imaging vision, where the pose estimation apparatus is mounted on a robotic arm loaded on a specialized robot working in smoke, combustion, and explosion environments, and the estimation method includes following steps:

S1: performing, by a monocular infrared thermal imaging camera, imaging in the smoke, combustion, and explosion environments, and acquiring an infrared thermally-imaged visual image;

S2: performing, by an edge computing platform, detection, positioning, pose estimation, and coordinate parameter extraction on a to-be-grasped target based on an infrared imaged visual image;

S3: ranging, by a laser ranging module mounted at a bottom of the monocular infrared thermal imaging camera and having a ranging point registered to coincide with a center point of an infrared image, the to-be-grasped target, and making a motion plan for the robotic arm based on the extracted coordinate parameter and an obtained distance; and S4: generating a control signal based on a planned motion path, and controlling, by using an embedded microcontroller, the robotic arm to grasp the target.

The present disclosure has following beneficial effects:

(1) A monocular infrared thermal imaging camera in the present disclosure can obtain an infrared thermally-imaged image in smoke, combustion, and explosion environments, and its imaging quality is less affected by light, smoke, and dust, such that the monocular infrared thermal imaging camera is suitable for a specialized robot working in these environments. A laser ranging module is configured to measure a distance of a to-be-grasped target. An edge computing platform runs the pose estimation method for grasping a target in the present disclosure. An embedded microcontroller generates a control signal for a robotic arm. In addition, the present disclosure proposes an algorithm process based on infrared saliency object detection, to-be-grasped target determining, and coordinate mapping and translation to estimate a pose of the to-be-grasped target and extract a grasping parameter in the infrared thermally-imaged image obtained by an infrared visual sensor. A lightweight and high-precision infrared saliency object detection network, namely, an infrared energy distribution attention infrared saliency object detection net (IEDA-detection net), is designed to detect and segment a saliency object in the infrared thermally-imaged image. Based on detection and segmentation results, the to-be-grasped target is determined. Afterwards, based on a coordinate system of the target in the image, parameter mapping and translation are performed, and a distance parameter is extracted, to ultimately and accurately estimate the pose of the to-be-grasped target and grasp the target in real time. The robotic arm mounted on the specialized robot working in the smoke, combustion, and explosion environments can efficiently estimate the pose of the to-be-grasped target and automatically grasp the target by using this apparatus and method, which has significant application value in technical fields such as emergency rescue and disaster relief, fire protection, explosion prevention, and security.

(2) The present disclosure designs a pose estimation and grasping control apparatus for a robotic arm to grasp a target based on monocular infrared thermal imaging vision, which includes the monocular infrared thermal imaging camera, the laser ranging module, the edge computing platform, and the embedded microcontroller to meet a requirement of the specialized robot working in the smoke, combustion, and explosion environments for automatically grasping the target.

(3) The present disclosure designs a core algorithm framework constituted by infrared saliency object detection, to-be-grasped target selection, target grasping coordinate mapping, target distance obtaining to replace a target positioning and pose estimation framework with high computational complexity, so as to deploy the algorithm framework on the edge computing platform and automatically grasp the target in real time.

(4) The present disclosure designs the lightweight infrared saliency object detection network. An infrared energy distribution enhancement attention module (IEDEAM) in the present disclosure is used to enhance edge and contrast information of an infrared feature extracted by the network, and optimized infrared features of various scales are input into various feature fusion modules in a decoder in a full-scale connection mode in the present disclosure for fusion, to enhance a representation capability of extracting an infrared feature based on each scale, and ultimately efficiently and accurately detect and segment an infrared saliency object.

(5) The present disclosure designs a fast and efficient method for mapping grasping coordinates of the target and obtaining the distance of the target to extract a pose estimation parameter of the to-be-grasped target and control the robotic arm to grasp the target in real-time.

DETAILED DESCRIPTION OF THE EMBODIMENTS

Specific implementations of the present disclosure will be described below so that those skilled in the art can understand the present disclosure, but it should be clear that the present disclosure is not limited to the scope of the specific implementations. For those of ordinary skill in the art, as long as various changes fall within the spirit and scope of the present disclosure defined and determined by the appended claims, these changes are apparent, and all inventions and creations using the concept of the present disclosure are protected.

Embodiment 1

Figure 1:
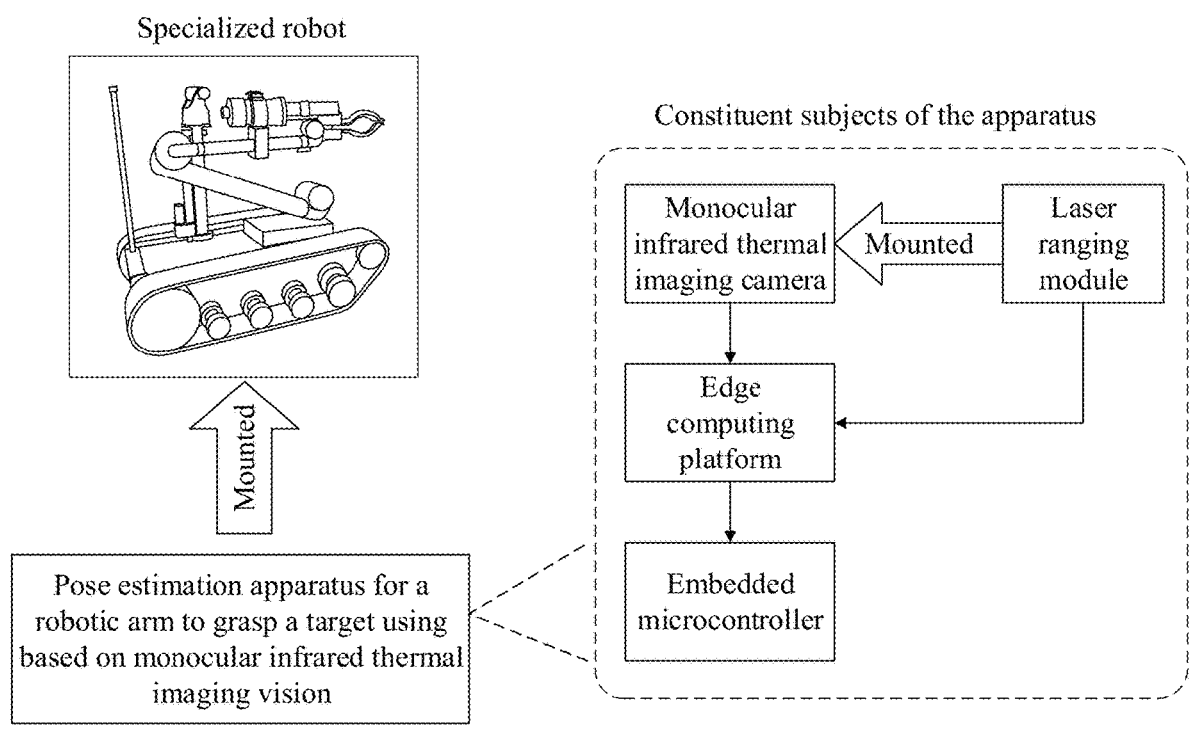
FIG. 1 is a schematic structural diagram of an apparatus according to the present disclosure.

As shown in FIG. 1, the present disclosure provides a pose estimation apparatus for a robotic arm to grasp a target based on monocular infrared thermal imaging vision, where the pose estimation apparatus is mounted on a robotic arm loaded on a specialized robot working in smoke, combustion, and explosion environments, and the pose estimation apparatus includes:

- a monocular infrared thermal imaging camera configured to perform imaging in the smoke, combustion, and explosion environments, and acquire an infrared thermally-imaged visual image;
- a laser ranging module mounted at a bottom of the monocular infrared thermal imaging camera, having a ranging point registered to coincide with a center point of an infrared image, and configured to range a to-be-grasped target;
- an edge computing platform configured to perform detection, positioning, pose estimation, and coordinate parameter extraction on the to-be-grasped target based on an infrared imaged visual image and a ranging result, and plan a motion path of the robotic arm; and
- an embedded microcontroller configured to generate a control signal based on the planned motion path to control the robotic arm to grasp the target.

In this embodiment, the apparatus designed in the present disclosure is mounted on the robotic arm loaded on the specialized robot working in the smoke, combustion, and explosion environments, to assist the robotic arm in automatically completing pose estimation and grasping control for the to-be-grasped target. A composition of the apparatus is shown in FIG. 1. A main part of the apparatus is constituted by the monocular infrared thermal imaging camera, the laser ranging module, the edge computing platform, and the embedded microcontroller. The entire apparatus is mounted on the robotic arm of the specialized robot. The monocular infrared thermal imaging camera is configured to perform imaging in the smoke, combustion, and explosion environments, and provide the infrared thermally-imaged visual image. The laser ranging module is mounted at the bottom of the monocular infrared thermal imaging camera with the ranging point registered to coincide with the center point of the infrared image, so as to fast and efficiently range the to-be-grasped target. The edge computing platform is configured to deploy an algorithm framework for performing the detection, positioning, pose estimation, and coordinate parameter extraction on the to-be-grasped target, and plan the motion path of the robotic arm. The embedded microcontroller generates the control signal based on the planned motion path provided by the edge computing platform to control the robotic arm to automatically grasp the target.

Figure 2:
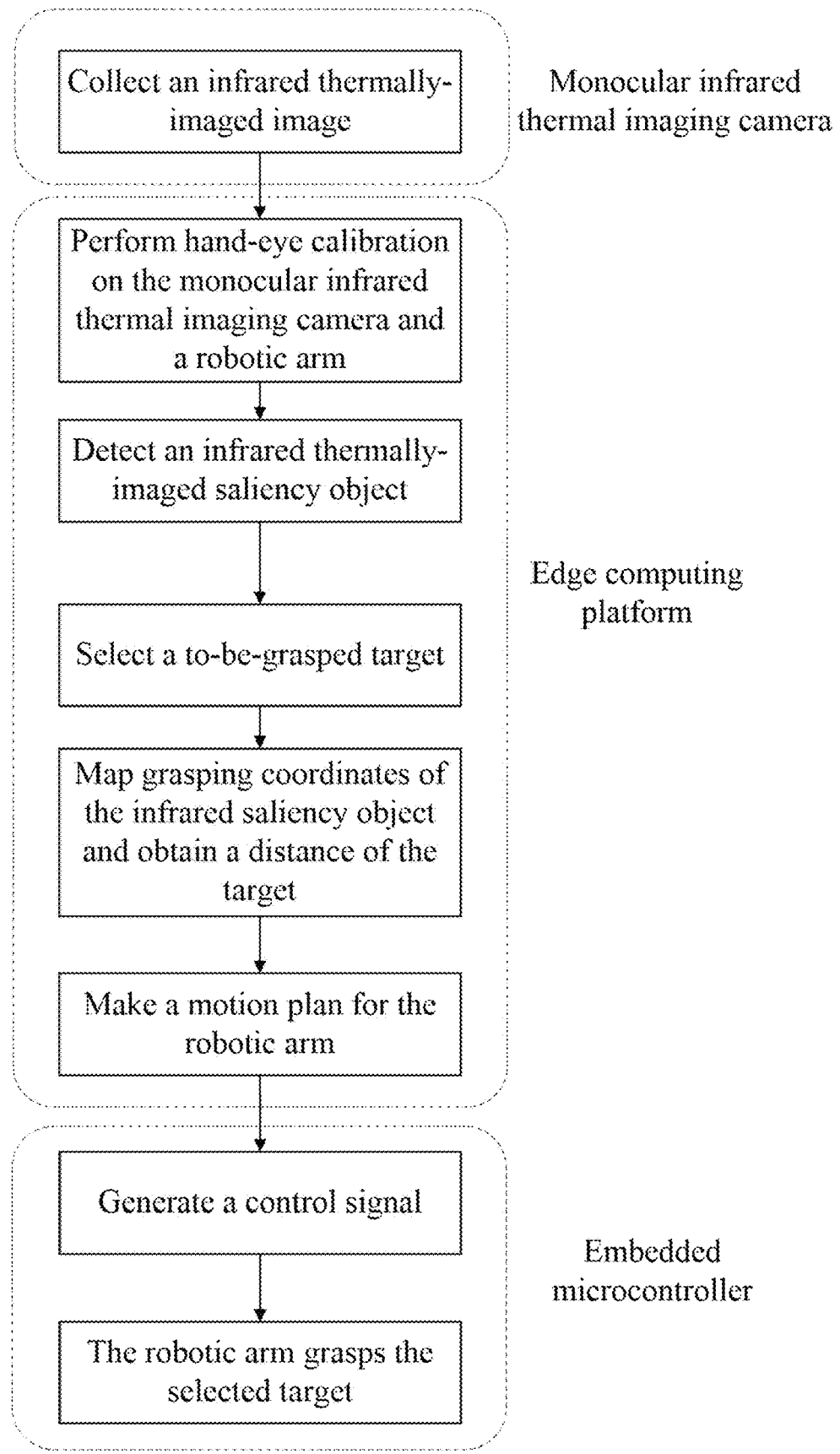
FIG. 2 shows a working process of an apparatus according to the present disclosure.

In this embodiment, a working process of the entire apparatus and a position of each functional module are shown in FIG. 2. Firstly, the monocular infrared thermal imaging camera mounted on the robotic arm acquires the infrared thermally-imaged image, and the edge computing platform processes the image. In a first step, hand-eye calibration is performed to determine a position coordinate relationship between the monocular infrared thermal imaging camera and a holder of the robotic arm. In a second step, infrared saliency object detection is performed to detect, position, and segment graspable infrared saliency objects in front of the robotic arm. In a third step, the to-be-grasped target is selected. In a fourth step, a coordinate relationship between the target and the infrared camera is obtained, including plane position coordinates, polar coordinates, and a distance. In a last step, based on the obtained coordinate parameters and distance, a motion plan is made for the robotic arm to grasp the target. The embedded microcontroller generates the control signal based on motion planning information provided by the edge computing platform to control the robotic arm to automatically grasp the target.

In this embodiment, the edge computing platform includes:

- a marking submodule configured to mark a lense of the monocular infrared thermal imaging camera and a hand/arm of the robotic arm, and determine the position coordinate relationship between the monocular infrared thermal imaging camera and the holder of the robotic arm;
- a target detection submodule configured to detect, position, and segment, by using an IEDA-detection net based on the position coordinate relationship, the graspable infrared saliency objects in front of the robotic arm to obtain a plurality of infrared saliency object detection results;
- a target selection submodule configured to select the to-be-grasped target based on the plurality of infrared saliency object detection results;
- a coordinate extraction submodule configured to estimate a target pose based on the to-be-grasped target, and obtain the coordinate relationship between the to-be-grasped target and the monocular infrared camera; and
- a motion planning submodule configured to make, based on the obtained coordinate relationship and the ranging result, the motion plan for the robotic arm to grasp the target.

Figure 3:
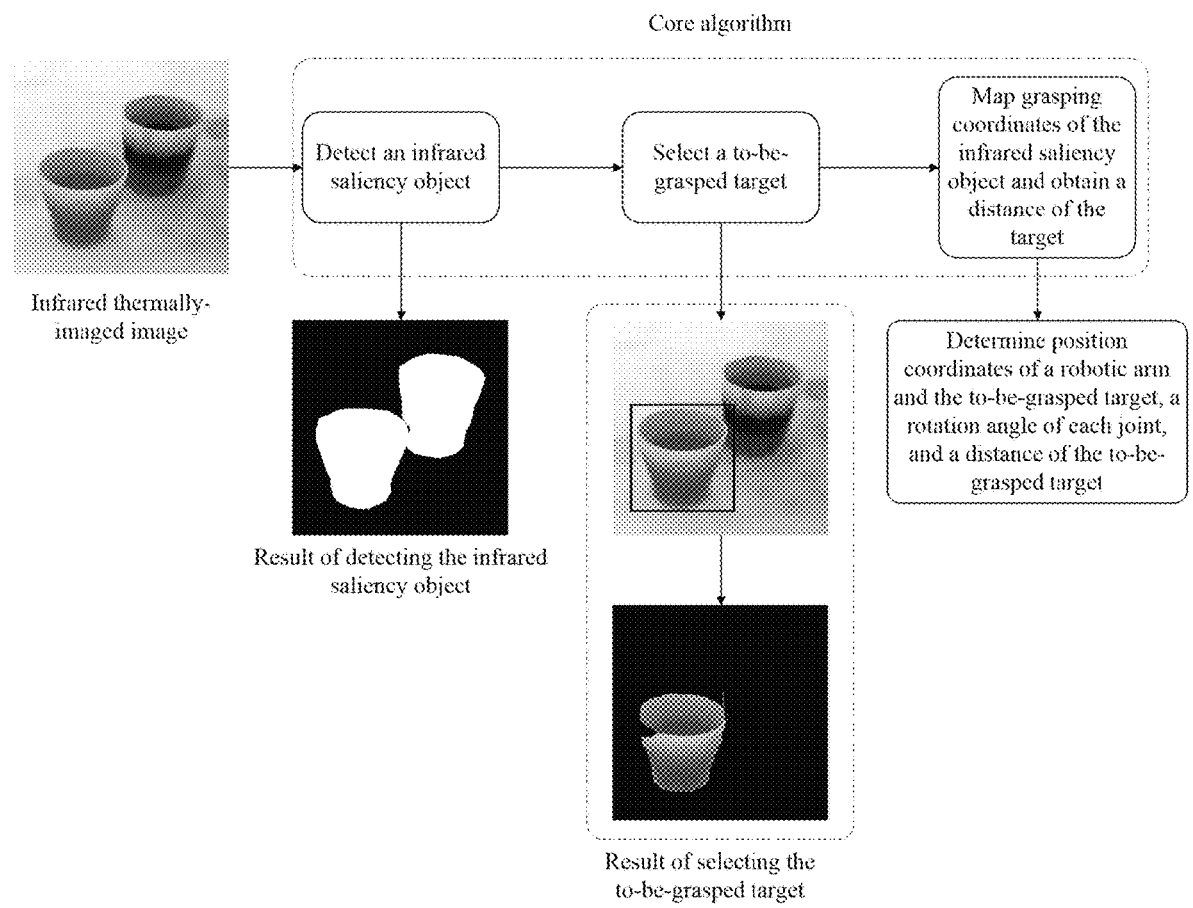
FIG. 3 is a flowchart of detecting an infrared saliency object according to the present disclosure.

In this embodiment, a process of a core innovative algorithm of the present disclosure includes three steps in the edge computing platform: the infrared saliency object detection, to-be-grasped target selection, and coordinate mapping and target distance obtaining for grasping the infrared saliency object, as shown in FIG. 3. The infrared saliency object detection is intended to position, detect, and segment a saliency object in the infrared thermally-imaged visual image, and determine a quantity, positions, and morphological segmentation of targets that the robotic arm may grasp in the smoke, combustion, and explosion environments. Based on a plurality of detected infrared saliency objects, the to-be-grasped target is further determined. In the last step of the core algorithm, coordinate extraction and mapping, and distance obtaining are performed on the selected to-be-grasped target to determine position coordinates of the robotic arm and the to-be-grasped target, a rotation angle of each joint, and the distance of the to-be-grasped target. The process of the core algorithm simplifies a complex process in which a commonly used robotic arm needs to perform target positioning, 6D pose estimation, and grasping point coordinate mapping in an automatic target grasping process. Especially, based on infrared saliency information represented by a target temperature in the infrared thermally-imaged image, the infrared saliency object detection method is directly used to detect, position, and segment the to-be-grasped target, and perform efficient and concise target pose estimation based on a segmentation result. In this way, the 6D pose estimation method, which consumes a lot of computation, is avoided, such that the algorithm framework is lightweight and easy to be deployed on the edge computing platform.

In this embodiment, the IEDA-detection net includes an encoder and a decoder. The encoder extracts a feature of the infrared saliency object stage by stage, and determines a position, a category, and a segmented edge of the infrared saliency object based on an extracted multi-scale feature. The decoder performs upsampling stage by stage based on its input, and fuses the multi-scale feature to restore resolution of the feature map, thereby ultimately obtaining complete detection, positioning, and segmentation results of the infrared saliency object.

The encoder is divided into four feature extraction stages: a first feature extraction stage, a second feature extraction stage, a third feature extraction stage, and a fourth feature extraction stage, and extracts four infrared feature maps with different scales and receptive fields by using a feature map downsampling mechanism. In the encoder and the decoder in each feature extraction stage, an IEDEAM is added to enhance an extracted infrared feature to obtain an infrared energy distribution attention enhancement feature map, and a full-scale aggregation architecture is used to perform multi-scale reuse on an enhanced infrared feature map input into the decoder.

The decoder adopts four feature fusion modules, namely, a first feature fusion module, a second feature fusion module, a third feature fusion module, and a fourth feature fusion module, to fuse a multi-scale enhanced infrared feature map, and restores the resolution of the feature map by using a stepwise upsampling mechanism, to obtain the plurality of infrared saliency object detection results.

An expression for fusing the multi-scale enhanced infrared feature map is as follows:

$$Ffi' = \begin{cases} \text{Fused}(Fei', Sj(Fej)) \; i' = 1, j = 2, 3, 4 \\ \text{Fused}(Fei', Dr(Fer), Sj(Fej)) \; i' = 2, r = 1, j = 3, 4; i' = 3, r = 1, 2, j = 4 \\ \text{Fused}(Fei', Dr(Fer)) \; i' = 4, r = 1, 2, 3 \end{cases}$$

In the above expression, Ffi' represents a multi-scale fused feature map in an $i'^{th}$ stage of the decoder, $i' \in [1 \ldots 4]$, Fused(·) represents a fusion operation of the fusion module in the decoder, Fei', Fej, and Fer respectively represent infrared energy distribution attention enhancement feature maps in the $i'^{th}$ stage, an $r^{th}$ stage, and a $j^{th}$ stage, i', r, j∈[1 ... 4], Sj(·) represents an upsampling operation in the $j^{th}$ stage, and Dr(·) represents a downsampling operation in the $r^{th}$ stage.

In this embodiment, in the process of the core algorithm in the present disclosure, the infrared saliency object detection method is adopted for detecting, positioning, and segmenting the to-be-grasped target. The present disclosure proposes a lightweight and high-precision infrared saliency object detection network for detecting the infrared saliency object in the infrared thermally-imaged image in the smoke, combustion, and explosion environments, which is named the IEDA-detection net. The network is characterized by a lightweight design, high real-time performance, and easy deployment on the edge computing platform, and improves detection and segmentation accuracy for an infrared saliency object with an unclear detail, a fuzzy edge, and a low ambient temperature contrast. In this network, the IEDEAM is designed to enhance a representation capability of extracting key information such as a detail, an edge, and a contrast from the infrared feature, a full-scale feature aggregation architecture (FSFAA) is designed to fully integrate and reuse an optimized multi-scale infrared feature, and a simple EFFM is proposed to adaptively fuse the multi-scale feature.

Figure 4:
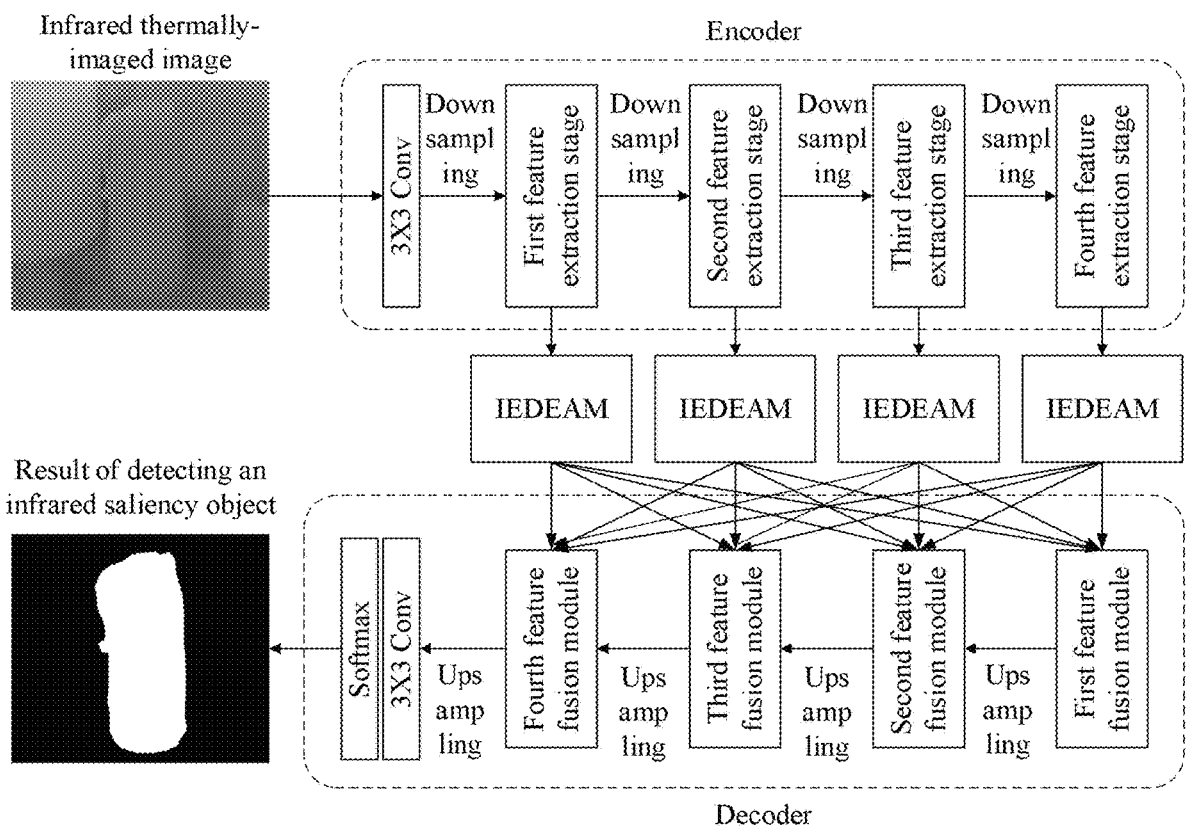
FIG. 4 is a frame diagram of an IEDA-detection net according to the present disclosure.

In this embodiment, an overall architecture of the IEDA-detection net of the present disclosure is shown in FIG. 4. The IEDA-detection net in the present disclosure is generally constituted by the encoder and the decoder. The encoder is divided into the four feature extraction stages, and adopts the feature map downsampling mechanism to extract the four infrared feature maps with different scales and receptive fields. In the encoder and the decoder in each feature extraction stage, the IEDEAM in the present disclosure is added to enhance the extracted infrared feature. After that, the FSFAA is used to perform multi-scale reuse on the enhanced infrared feature input into the decoder. The decoder adopts the four feature fusion modules to fuse a multi-scale enhanced infrared feature, and gradually restores the resolution of the feature map by using the stepwise upsampling mechanism, to obtain the infrared saliency object detection result.

In this embodiment, the first feature extraction stage includes two first residual blocks and a second residual block. One of the two first residual blocks has a kernel size of 3 and 2 strides and the other one has a kernel size of 3 and 1 stride. The second residual block is provided with a squeeze and excitation module (SEM).

The second feature extraction stage includes a third residual block having a kernel size of 3 and 1 stride, and a fourth residual block having a kernel size of 5 and 2 strides. The fourth residual block is provided with a SEM.

The third feature extraction stage includes two fifth residual blocks with each having a kernel size of 3 and 1 stride, and a sixth residual block having a kernel size of 5 and 2 strides. Both the fifth residual block and the sixth residual block are provided with a SEM.

The fourth feature extraction stage includes five seventh residual blocks with each having a kernel size of 3 and 1 stride, and an eighth residual block having a kernel size of 5 and 2 strides. Both the seventh residual block and the eighth residual block are provided with a SEM.

In this embodiment, the encoder in the IEDA-detection net in the present disclosure adopts a tailored version of a lightweight feature extraction backbone network MobileNetV3-Large for an infrared saliency object detection task, which effectively extracts a multi-scale infrared image feature while achieving a lightweight network structure. Original resolution of the input infrared thermally-imaged visual image is 384×288. In a feature initialization stage, one convolutional layer having a kernel size of 3 and 2 strides is used to output feature maps of 16 channels. After downsampling, a size of the feature map is 192×144, and the first feature extraction stage is entered. This stage is constituted by the two first residual blocks and the second residual block. One of the two first residual blocks has a kernel size of 3 and 2 strides and the other one has a kernel size of 3 and 1 stride. The second residual block is provided with the SEM, which outputs feature maps of 24 channels. After the extracted feature map is downsampled and its size reaches 96×72, the second feature extraction stage is entered. This stage is constituted by the third residual block having a kernel size of 3 and 1 stride, and the fourth residual block having a kernel size of 5 and 2 strides. The fourth residual block is provided with the SEM, which outputs feature maps of 40 channels. After the feature map is downsampled and its size reaches 24×18, the third feature extraction stage is entered. This stage is constituted by the two fifth residual blocks with each having a kernel size of 3 and 1 stride, and the sixth residual block having a kernel size of 5 and 2 strides. Both the fifth residual block and the sixth residual block are provided with the SEM, which outputs feature maps of 80 channels. After the feature map is downsampled and its size reaches 12×9, the fourth feature extraction stage is entered. This stage is constituted by the five seventh residual blocks with each having a kernel size of 3 and 1 stride, and the eighth residual block having a kernel size of 5 and 2 strides. Both the seventh residual block and the eighth residual block are provided with the SEM, which outputs feature maps of 112 channels. It is worth noting that in order to meet a requirement for the infrared saliency object detection and simplify the network structure, both a convolutional layer and a pooling layer after the four feature extraction stages of the MobileNetV3-Large are tailored.

In this embodiment, the IEDEAM includes:
a wavelet transform-specific feature energy distribution coefficient calculation subunit configured to perform wavelet transform on the extracted infrared feature map to obtain a low-frequency component feature map, a horizontal high-frequency component feature map, a vertical high-frequency component feature map, and a diagonal high-frequency component feature map of the infrared feature map, and calculate an infrared energy distribution coefficient based on the low-frequency component feature map, the horizontal high-frequency component feature map, the vertical high-frequency component feature map, and the diagonal high-frequency component feature map, where
expressions of the low-frequency component feature map, the horizontal high-frequency component feature map, the vertical high-frequency component feature map, and the diagonal high-frequency component feature map are as follows:

$$FLi=dwt2\_L(Fi)$$

$$FHi=dwt2\_H(Fi)$$

$$FVi=dwt2\_V(Fi)$$

$$FDi=dwt2\_D(Fi)$$

where FLi represents a low-frequency component of wavelet transform for a feature map of an $i^{th}$ channel, dwt2_L represents an operation of extracting a low-frequency component for 2D wavelet transform by taking an Haar operator as a wavelet base, Fi represents the feature map of the $i^{th}$ channel, FHi represents a horizontal high-frequency component of the wavelet transform for the feature map of the $i^{th}$ channel, dwt2_H represents an operation of extracting a horizontal high-frequency component for the 2D wavelet transform by taking the Haar operator as the wavelet base, FVi represents a vertical high-frequency component of the wavelet transform for the feature map of the $i^{th}$ channel, dwt2_V represents an operation of extracting a vertical high-frequency component for the 2D wavelet transform by taking the Haar operator as the wavelet base, FDi represents a diagonal high-frequency component of the wavelet transform for the feature map of the $i^{th}$ channel, and dwt2_D represents an operation of extracting a diagonal high-frequency component for the 2D wavelet transform by taking the Haar operator as the wavelet base; and
an expression of the infrared energy distribution coefficient is as follows:

$$W = \text{Norm}\left(\sum_{i=1}^{N}\text{Sum}(FLi+FHi+FVi+FDi)/N\right)$$

$$WL = \frac{\text{Norm}\left(\sum_{i=1}^{N}\text{Sum}(FLi)/N\right)}{W}$$

$$WH = \frac{\text{Norm}\left(\sum_{i=1}^{N}\text{Sum}(FHi)/N\right)}{W}$$

$$WV = \frac{\text{Norm}\left(\sum_{i=1}^{N}\text{Sum}(FVi)/N\right)}{W}$$

$$WD = \frac{\text{Norm}\left(\sum_{i=1}^{N}\text{Sum}(FDi)/N\right)}{W}$$

where W represents total energy of the feature map on the wavelet transform components, Norm(·) represents a normalization operation, N represents a quantity of feature channels, Sum(·) represents pixel summation, and WL, WH, WV, and WD respectively represent infrared energy distribution coefficients of the low-frequency, horizontal, vertical, and diagonal components; and
an infrared feature map enhancement and reconstruction subunit configured to enhance and reconstruct the infrared feature map based on the infrared energy distribution coefficient to obtain the infrared energy distribution attention enhancement feature map:

$$Fe=ReLU(FdwR+Fc)$$

$$FdwR=Idwt2(1\times1Conv(ReLU(1\times1Conv(WL\otimes FL, WH\otimes FH, WV\otimes FV, WD\otimes FD))))$$

$$Fc=1\times1Conv(ReLU(1\times1Conv(F)))$$

where Fe represents the infrared energy distribution attention enhancement feature map, ReLU represents a ReLU activation function, FdwR represents a wavelet-reconstructed infrared feature map, Fc represents an original infrared feature map processed by the convolutional layer and an activation function, FL, FH, FV, and FD) respectively represent wavelet-transformed infrared feature maps of the low-frequency, horizontal, vertical, and diagonal components, 1×1Conv represents a convolutional layer having one convolution kernel and one stride, and Idwt2 represents inverse 2D wavelet transform by taking the Haar operator as the wavelet base.

Figure 5:
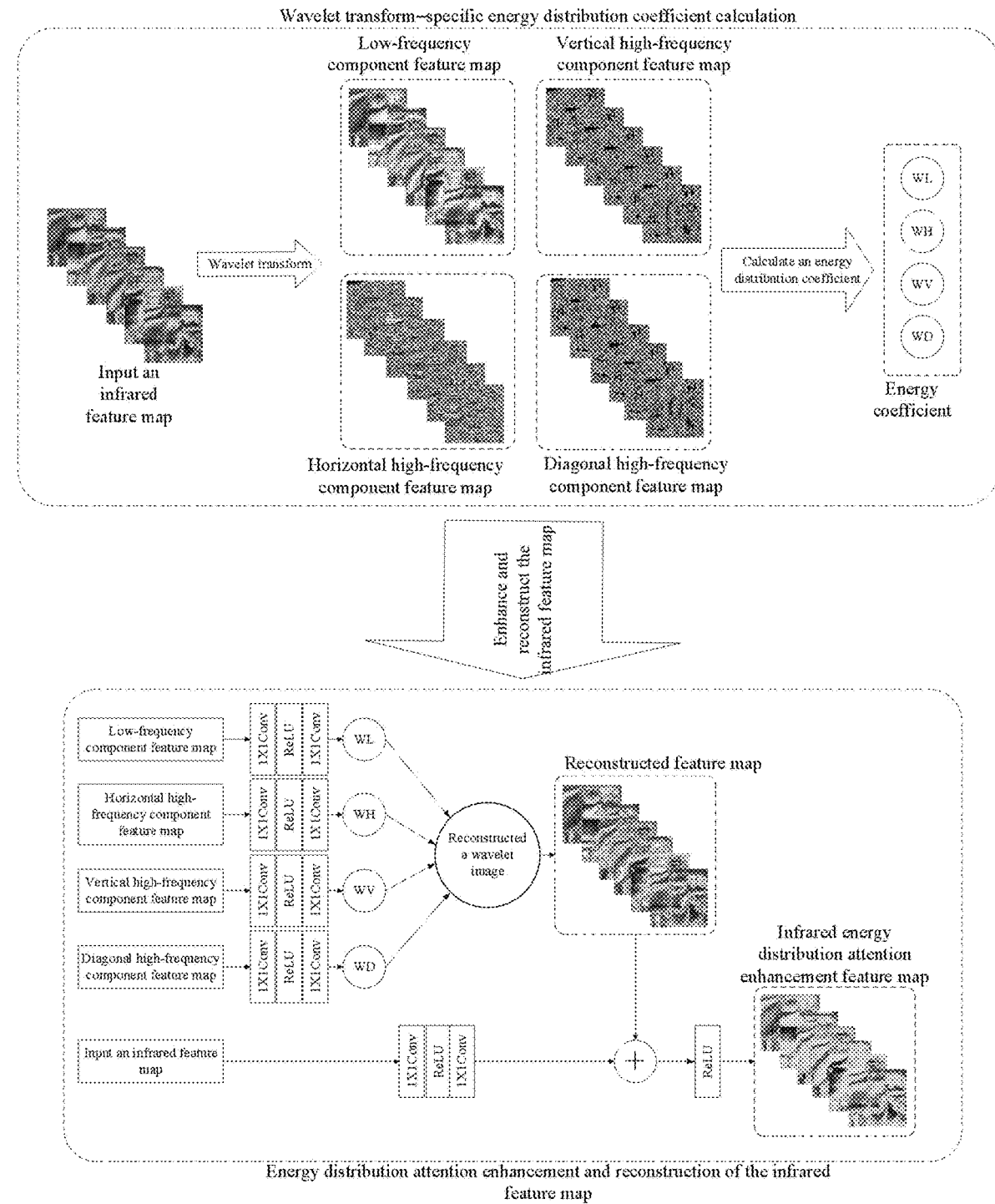
FIG. 5 is a schematic diagram of a working principle of an IEDEAM according to the present disclosure.

In this embodiment, the IEDA-detection net of the present disclosure inserts the IEDEAM of the present disclosure in each feature extraction stage of the encoder and the decoder. A working principle of the IEDEAM proposed in the present disclosure is shown in FIG. 5. A working process of the IEDEAM is divided into two stages: a first stage in which a wavelet transform-specific feature energy distribution coefficient is calculated, and a second stage in which an energy distribution attention of the infrared feature map is enhanced and reconstructed.

In this embodiment, in the first stage, the wavelet transform-specific feature energy distribution coefficient is calculated to perform wavelet transform on the extracted infrared feature map to obtain the low-frequency component feature map, the horizontal high-frequency component feature map, the vertical high-frequency component feature map, and the diagonal high-frequency component feature map of the infrared feature map. The low-frequency component feature map reflects temperature difference contrast information in the infrared feature map, and the horizontal, vertical, and diagonal high-frequency component feature maps respectively reflect details, edges, and other information of infrared features in the corresponding directions.

In this embodiment, after the wavelet feature maps of the four components are extracted, the infrared energy distribution coefficient is calculated to determine a contribution degree of information on each component to the infrared feature, thereby determining a component that contains main information in the current infrared feature, to lay a foundation for the subsequent enhancement and reconstruction stage. That is, the infrared energy distribution coefficients of the low-frequency, horizontal, vertical, and diagonal components determine a contribution degree of feature information of each wavelet component to infrared feature enhancement in an enhancement and reconstruction process.

In this embodiment, in the second stage, the energy distribution attention of the infrared feature map is enhanced and reconstructed to enhance and reconstruct the infrared feature map based on the infrared energy distribution coefficient obtained in the first stage. The wavelet-transformed infrared feature maps of the four components pass through one convolutional layer having one convolution kernel and one stride and the ReLU activation function, pass through one convolutional layer having one convolution kernel and one stride, and then are multiplied by the energy distribution coefficients of the components respectively for feature map reconstruction. In this case, the obtained wavelet-reconstructed infrared feature map can highlight information of infrared energy concentration based on an infrared energy distribution. Finally, a result obtained after the original infrared feature map passes through the one convolutional layer having one convolution kernel and one stride and the ReLU activation function, and then passes through the one convolutional layer having one convolution kernel and one stride is added to the wavelet-reconstructed infrared feature map, and an obtained result passes through one ReLU activation function to obtain the infrared energy distribution attention enhancement feature map. The enhanced infrared feature map is optimized to enhance a temperature contrast, a detail texture, a saliency object edge, and other information in the infrared feature. It is worth noting that a channel quantity of an optimized enhanced feature map obtained by the IEDEAM corresponding to each stage is consistent with a channel quantity in the feature extraction stage.

The present disclosure designs the FSFAA in the IEDA-detection net to fully fuse and reuse the optimized multi-scale infrared feature in an input part of the decoder. The FSFAA performs upsampling/downsampling on the infrared energy distribution attention enhancement feature map of each stage, such that a feature map of each channel corresponds to each feature extraction stage in sequence. Then, a plurality of feature fusion modules are designed in the decoder to fuse and reuse infrared energy distribution attention enhancement feature maps of different stages. Therefore, a fused infrared feature that fuses a plurality of scales and a plurality of receptive fields is obtained in a decoding step, thereby enhancing a feature representation capability. It is worth noting that for infrared energy distribution attention enhancement feature maps of different scales, the upsampling/downsampling operation only changes sizes of the feature maps, without changing channel quantities of the feature maps.

In this embodiment, the feature fusion modules have a same structure, including an input terminal, a splicing path and an accumulation path that are separately connected to the input terminal, a ReLU activation function layer separately connected to the splicing path and the accumulation path, and an output terminal connected to the ReLU activation function layer.

The input terminal is configured to receive infrared energy distribution attention enhancement features of four scales.

The splicing path is configured to correspond a channel quantity of an output fused feature map to a feature channel extracted by the encoder in a corresponding stage, and represent a fused feature obtained by the splicing path as a global semantic feature. The splicing path includes a splicing layer, two convolutional layers with each having a kernel size of 3 and 1 stride, two batch normalization layers, and one ReLU activation function.

The accumulation path is configured to: adjust the channel quantity of the feature map to a channel quantity of an infrared feature extracted by the encoder in the corresponding stage, correspond the channel quantity of the output fused feature map to the feature channel extracted by the encoder in the corresponding stage, and use a fused feature obtained by the accumulation path to represent a local detail feature.

The ReLU activation function layer is configured to add the fused feature obtained by the splicing path and the fused feature obtained by the accumulation path to obtain an adaptively fused feature:

$$Ff = ReLU(Fcat + Facc)$$

$$Fcat = BN(3 \times 3Conv(ReLU(BN(3 \times 3Conv(Fin(n))))))$$

$$Facc = BN\left(3 \times 3Conv\left(\sum_{i=1}^{n=4} 3 \times 3Conv(Fin(n))\right)\right)$$

where Ff represents the adaptively fused feature, ReLU(·) represents the ReLU activation function, Fcat represents the fused feature obtained by the splicing path, Facc represents the fused feature obtained by the accumulation path, BN(·) represents a batch normalization operation, 3×3Conv represents a convolution operation having a kernel size of 3 and 1 stride, Fin(n) represents input infrared energy distribution attention enhancement features of n scales, and n=4.

The output layer is configured to output a fused multi-scale enhanced infrared feature map based on the adaptively fused feature.

Figure 6:
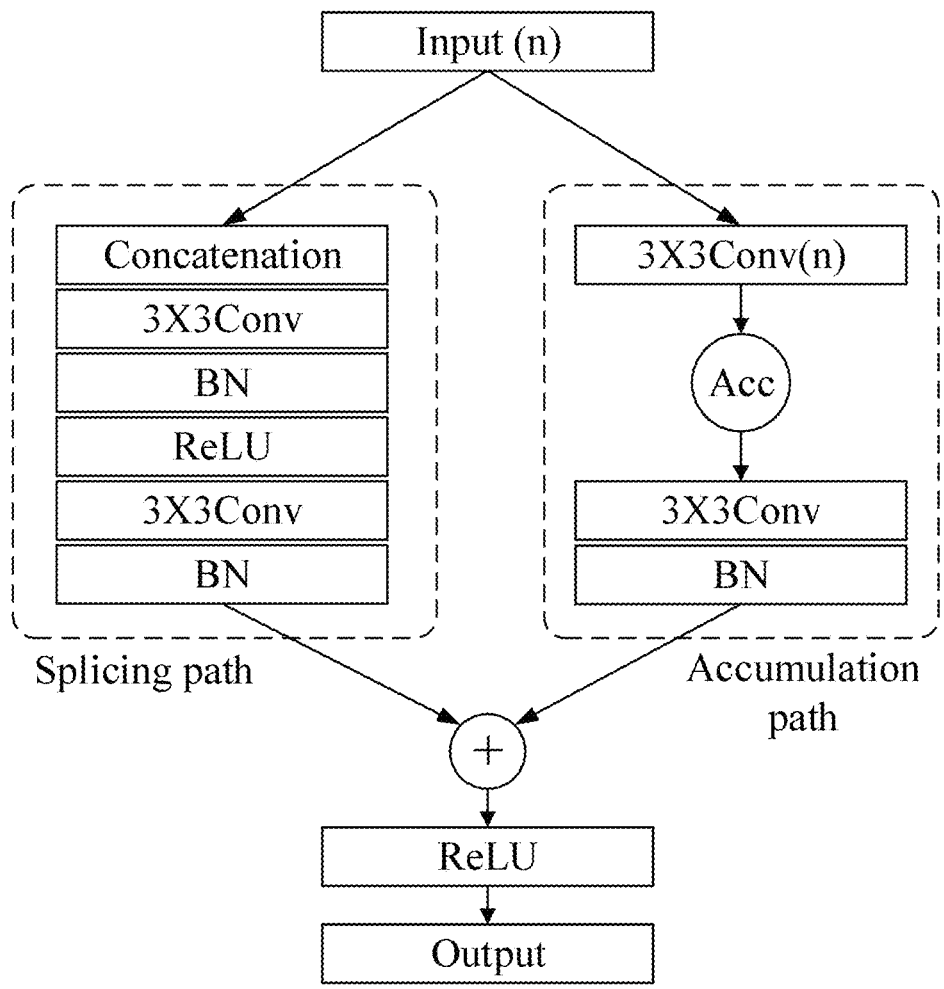
FIG. 6 is a schematic structural diagram of an efficient feature fusion module (EFFM) according to the present disclosure.

In this embodiment, in order to adaptively fuse and reuse a multi-scale infrared energy distribution attention enhancement feature, the four EFFMs are designed at the decoder of the IEDA-detection net in the present disclosure to fuse and reuse the multi-scale feature, and perform upsampling step by step. Finally, the infrared saliency object detection and segmentation result is obtained by using one convolutional layer having a kernel size of 3 and 1 stride and a Softmax classifier. A structure of the designed EFFM is shown in FIG. 6. The infrared energy distribution attention enhancement features of the four scales are input into the feature fusion module and are divided into two paths internally, namely, the splicing path and the accumulation path. Finally, feature fusion results of the two paths are added to obtain an adaptive feature fusion and reuse result by using one ReLU activation function.

In this embodiment, the splicing path of each feature fusion module includes the splicing layer, the two convolutional layers with each having a kernel size of 3 and 1 stride, the two batch normalization layers, and the one ReLU activation function. The channel quantity of the output fused feature map corresponds to the feature channel extracted by the encoder in this stage. The fused feature obtained by the splicing path can better represent the global semantic feature.

In this embodiment, the accumulation path of each feature fusion module mainly includes a splicing layer, five convolutional layers with each having a kernel size of 3 and 1 stride, and one batch normalization layer. Among the five convolutional layers, four parallel convolutional layers located in an input position are configured to adjust the channel quantity of the feature map to the channel quantity of the infrared feature extracted by the encoder in the corresponding stage. A channel quantity of a finally output fused feature map corresponds to the feature channel extracted by the encoder in this stage, and the fused feature obtained by the accumulation path can better represent a local detail feature.

In this embodiment, the adaptively fused feature is finally obtained through one ReLU activation function after the fused feature obtained by the splicing path and the fused feature obtained by the accumulation path are added.

In this embodiment, the target selection submodule includes:
 a first determining unit configured to determine, based on the plurality of infrared saliency object detection results, that it is set to manually specify the to-be-grasped target, and manually select the to-be-grasped target;
 a second determining unit configured to determine, based on the plurality of infrared saliency object detection results, that it is set to automatically select the to-be-grasped target, measure a saliency region obtained through segmentation, select a target with a highest regional temperature, and grasp the target; and
 a third determining unit configured to determine whether there is an obstruction in front of the to-be-grasped target, and grasp the obstruction, place the obstruction aside, and select the to-be-grasped target if there is the obstruction in front of the to-be-grasped target, or directly select the to-be-grasped target if there is no obstruction in front of the to-be-grasped target.

Figure 7:
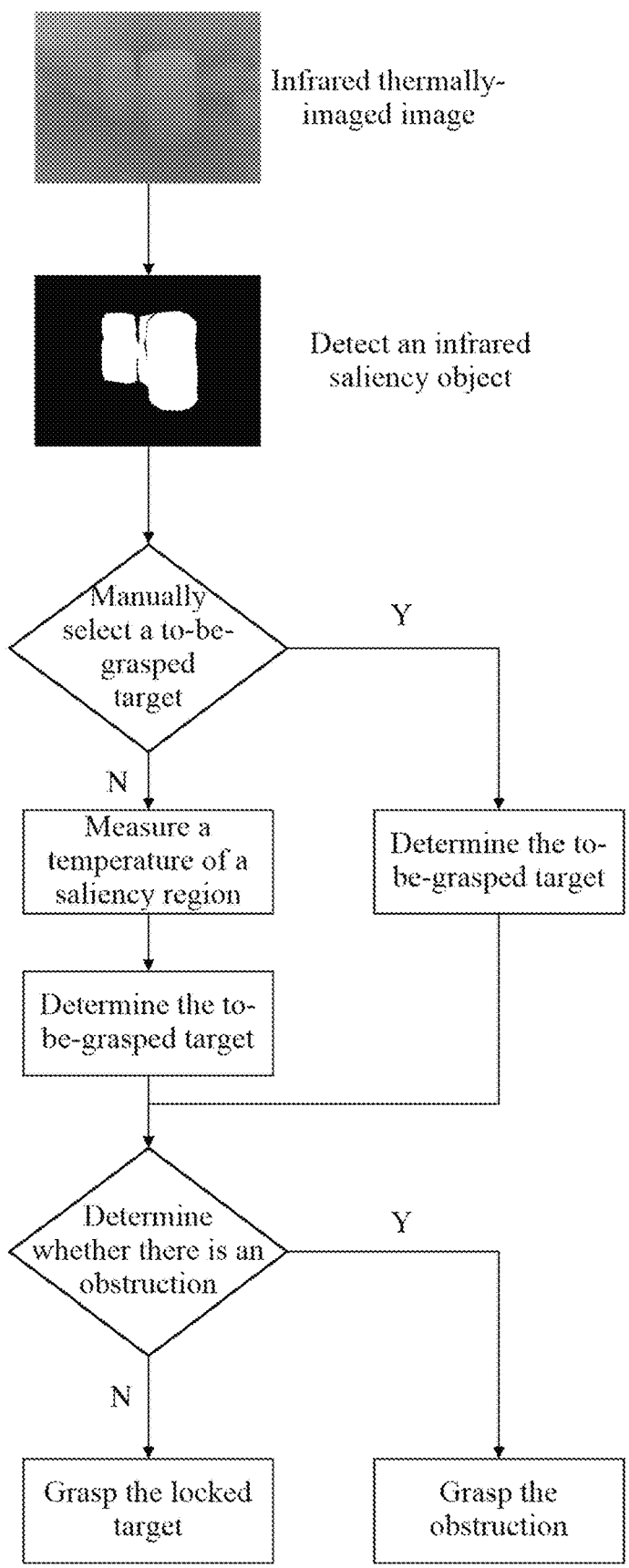
FIG. 7 is a flowchart of selecting a to-be-grasped target by a robotic arm according to the present disclosure.

In this embodiment, after the infrared saliency object detection and segmentation result is obtained, a plurality of infrared saliency objects may be obtained through positioning and segmentation. Therefore, it is necessary to determine the current single to-be-grasped target. The present disclosure proposes a process for determining the to-be-grasped target of the robotic arm, as shown in FIG. 7. As shown in the flowchart, the infrared saliency object detection result is obtained from the acquired infrared thermally-imaged visual image, and in the presence of the plurality of infrared saliency objects, a target selection process is entered. Firstly, whether the to-be-grasped target is manually specified is determined. If the to-be-grasped target is manually specified, the specified target is grasped. If it is set to automatically select the to-be-grasped target, temperature measurement is performed on the saliency region obtained through the segmentation, and the target with the highest temperature in the region is selected for grasping. Next, it is necessary to determine whether there is the obstruction in front of the to-be-grasped target. If there is the obstruction in front of the to-be-grasped target, it is necessary to first grasp the obstruction and place the obstruction aside, such that the obstruction does not obstruct the to-be-grasped target. If there is no obstruction in front of the to-be-grasped target, the selected target is grasped.

In this embodiment, the coordinate extraction submodule includes:
 a centroid determining unit for the to-be-grasped target configured to determine a centroid of the to-be-grasped target based on the to-be-grasped target, and use the centroid of the to-be-grasped target as a center point to make perpendicular lines intersecting in vertical and horizontal directions; and
 a grasping point determining unit configured to rotate the perpendicular lines, calculate a distance from the perpendicular line in the horizontal direction to a segmented edge, and select two edge points with a smallest distance as target grasping points to obtain the coordinate relationship between the to-be-grasped target and the infrared camera.

The target grasping point is expressed as follows:

$$Dx\ min=Min(Dx(\theta))\ \theta\in(0,360)$$

$$Gl(x,y)=(xl,yl)Dx=Dx\ min$$

$$Gr(x,y)=(xr,yr)Dx=Dx\ min$$

where Dxmin represents a minimum distance between the centroid of the to-be-grasped target on the perpendicular line in the horizontal direction and two edge points in the horizontal direction, Min(·) represents a minimum value operation, Dx(θ) represents a distance between the centroid of the to-be-grasped target on the perpendicular line in the horizontal direction and the two edge points in the horizontal direction during each rotation based on an angle θ, Gl(x, y) and Gr(x, y) respectively represent left and right grasping points of the to-be-grasped target, (xl, yl) and (xr, yr) respectively represent coordinates of the left and right grasping points of the to-be-grasped target, and Dx represents a distance between the centroid on the perpendicular line in the horizontal direction and the two edge points in the horizontal direction; and in a process of rotating the to-be-grasped target based on the angle θ, when the distance Dx between the two edge points in the horizontal direction and the centroid on the perpendicular line in the horizontal direction between the left and right grasping points (Gl(x, y) and Gr(x, y)) reaches Dxmin, the coordinates (xl, yl) of the left grasping point and the coordinates (xr, yr) of the right grasping point are determined as the coordinates of the two grasping points of the to-be-grasped target.

Figure 8:
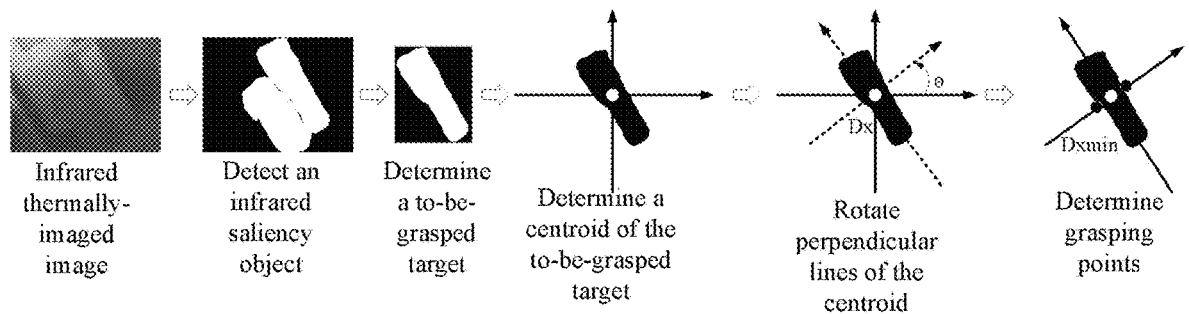
FIG. 8 is a flowchart of obtaining a target grasping point according to the present disclosure.

In this embodiment, after the to-be-grasped target is determined, target pose estimation is performed based on the infrared saliency object detection result of the selected to-be-grasped target to determine a position and a direction of the to-be-grasped target. Firstly, based on the infrared saliency object detection and segmentation result of the to-be-grasped target, the direction and a pose of the to-be-grasped target are determined to determine the grasping point of the target. The grasping point needs to be obtained based on a placement direction of the to-be-grasped target relative to the infrared thermal imaging camera, and pose and shape information of the target itself. The edge and centroid information provided for the to-be-grasped target through infrared saliency object segmentation can reflect the pose and a shape of the target, thus determining the grasping point. A process of obtaining the target grasping points is shown in FIG. 8. The detection and segmentation result is obtained after the infrared saliency object detection is performed on the acquired infrared thermally-imaged visual image. Then the to-be-grasped target is selected, and the centroid of the target is determined. The centroid of the target is used as the center point to make the perpendicular lines intersecting in the vertical and horizontal directions. After that, the perpendicular lines are rotated, the distance from the perpendicular line in the horizontal direction to the segmented edge is calculated, and the two edge points with the smallest distance are selected as the target grasping points. The centroid of the to-be-grasped target is a geometric center point of a segmentation form of the to-be-grasped target, and the perpendicular lines intersecting in the vertical and horizontal directions are made with the centroid as the center to estimate a placement pose of the to-be-grasped target relative to the infrared thermal imaging camera. The two perpendicular lines are rotated at a Θ angle by taking the centroid as the center, taking 0.5 degrees as a step, and traversing 0 to 360 degrees, and the distance between the centroid on the perpendicular line in the horizontal direction and the two edge points in the horizontal direction is stored. When the distance reaches its minimum, the pose of the to-be-grasped target and optimal grasping points under the pose and the shape of the target are determined.

In this embodiment, the coordinate extraction submodule includes:

a plane rotation angle parameter obtaining unit configured to establish plane coordinates based on the to-be-grasped target and a center point (x0, y0) of an image of the monocular infrared thermal imaging camera, and calculate a difference between the center point of the plane coordinates and coordinates (xs, ys) of the centroid of the to-be-grasped target to obtain a plane rotation angle parameter:

$$Xt=x0-xs$$

$$Yt=y0-ys$$

where when Xt is a negative number, it indicates that a position of the to-be-grasped target deviates to right relative to the center point of the infrared thermal imaging camera, and the robotic arm needs to translate right by |Xt| pixels; when Xt is a positive number, it indicates that the position of the to-be-grasped target deviates to left relative to the center point of the infrared thermal imaging camera, and the robotic arm needs to translate left by |Xt| pixels; when Yt is a negative number, it indicates that the position of the to-be-grasped target deviates upwards relative to the center point of the infrared thermal imaging camera, and the robotic arm needs to translate upwards by |Yt| pixels; and when Yt is a positive number, it indicates that the position of the to-be-grasped target deviates downwards relative to the center point of the infrared thermal imaging camera, and the robotic arm needs to translate downwards by |Yt| pixels;

a first alignment unit configured to make the coordinates of the centroid of the to-be-grasped target coincide with coordinates of a center of the image of the infrared camera based on the plane rotation angle parameter, so as to align a plane position of the robotic arm with the to-be-grasped target;

a polar coordinate rotation angle parameter calculation unit configured to align the plane position of the robotic arm with the to-be-grasped target, establish first polar coordinates based on the center (θ, R) of the image of the monocular infrared thermal imaging camera, establish second polar coordinates (θs, Rs) based on the centroid of the to-be-grasped target and the grasping point, and calculate a difference between angles of the first and second polar coordinates to obtain polar coordinate rotation angle parameter θt:

$$θt=θ0-θs$$

where when θt is a negative number, it indicates that the holder of the robotic arm needs to rotate counterclockwise by |θt| degrees; when θt is a positive number, it indicates that the holder of the robotic arm needs to rotate clockwise by |θt| degrees; θ0 represents a current angle of the first polar coordinates; and θs represents a current angle of the second polar coordinates; and a second alignment unit configured to align a grasping angle of the holder of the robotic arm with the grasping point of the to-be-grasped target based on the polar coordinate rotation angle parameter θt to obtain the coordinate relationship between the to-be-grasped target and the infrared camera.

Figure 9:
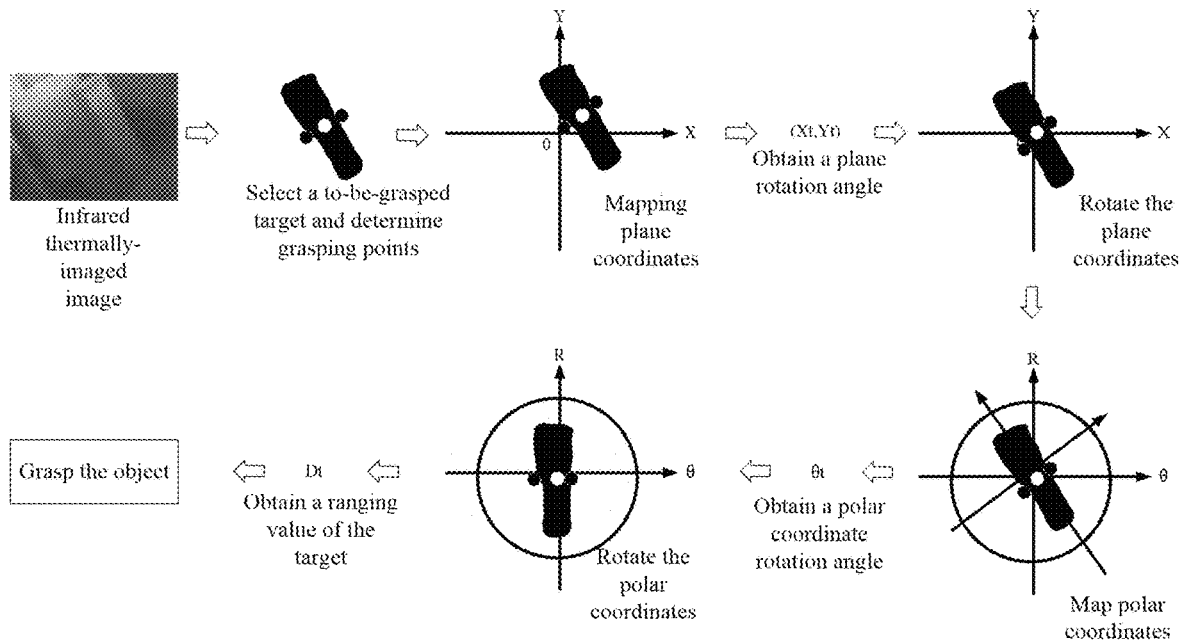
FIG. 9 is a flowchart of target pose estimation and grasping by a robotic arm based on monocular infrared thermal imaging vision according to the present disclosure.

In this embodiment, after the grasping point of the to-be-grasped target is determined, the position and pose coordinates of the to-be-grasped target are extracted to provide motion path planning parameters for the robotic arm to automatically grasp the target based on the infrared thermally-imaged image, such that the robotic arm automatically completes automatic target pose estimation and target grasping based on monocular infrared thermal imaging vision. An entire process is shown in FIG. 9. After the to-be-grasped infrared saliency object is detected from the acquired infrared thermally-imaged visual image and the grasping points are determined, the plane coordinates are established based on the center point (x0, y0) of the image of the monocular infrared thermal imaging camera, and the difference between the center point of the plane coordinates and the coordinates (xs, ys) of the centroid of the to-be-grasped target is calculated to obtain the plane rotation angle parameter (Xt,Yt). Based on the plane rotation angle parameter (Xt,Yt), after the robotic arm moves the plane coordinates, the coordinates of the centroid of the to-be-grasped target coincide with the coordinates of the center of the image of the infrared camera, that is, the plane position of the robotic arm is aligned with the to-be-grasped target.

In this embodiment, after the plane position of the robotic arm is aligned with the to-be-grasped target, the polar coordinates are established based on the center point (θ, R) of the image of the monocular infrared thermal imaging camera, and the polar coordinates (θs, Rs) are established based on the centroid of the to-be-grasped target and the grasping points. The angle difference between the aforementioned polar coordinates is calculated to obtain the polar coordinate rotation angle parameter θt. After the holder of the robotic arm moves the polar coordinates based on the polar coordinate rotation angle parameter θt, the grasping angle of the holder of the robotic arm is aligned with the grasping points of the to-be-grasped target. In this case, the laser ranging module is used to obtain ranging value Dt of the current to-be-grasped target. It is worth noting that in a previous calibration process, a ranging point of the laser ranging module has already coincided with the center point of the infrared thermal imaging camera. Finally, the automatic target pose estimation and target grasping are completed based on the monocular infrared thermally-imaged image.

The present disclosure has following beneficial effects:

1. The present disclosure provides a pose estimation apparatus for automatically grasping a target using a robotic arm of a specialized robot, which includes a monocular infrared thermal imaging camera, a laser ranging module, an edge computing platform, and an embedded processor. The monocular infrared thermal imaging camera can perform imaging based on a temperature difference between a target and an environment in smoke, combustion, and explosion environments in which a specialized robot works. The laser ranging module can assist in measuring a distance of a to-be-grasped target. An algorithm process in the present disclosure is deployed on the edge computing platform. The embedded processor completes motion control of a robotic arm. The apparatus is characterized by a lightweight design and high work efficiency, and is suitable for being mounted on a specialized robot platform.

2. Based on a characteristic of an infrared thermally-imaged image and a demand for the specialized robot to automatically grasp the target, an efficient core algorithm process for pose estimation on visually grasping the target based on a monocular infrared thermally-imaged image is proposed, including: infrared saliency object detection, to-be-grasped target selection, and target grasping coordinate mapping and target distance obtaining. Different from an existing algorithm process in which the robotic arm performs target detection, target segmentation, and 6D pose estimation when automatically grasping the target, the core algorithm process in the present disclosure avoids a complex algorithm framework and huge computation, and meets a deployment requirement and a real-time work requirement of the edge computing platform.

3. A key step of an algorithm in the present disclosure is infrared saliency object detection. For an infrared saliency object detection task, the present disclosure provides a lightweight infrared saliency object detection network, namely, an IEDA-detection net. For an infrared image with an unclear detail, a blurred edge, and a low contrast of an environment temperature difference, the network designs an IEDEAM to enhance a representation capability of extracting key information such as a detail, an edge, and a contrast in an infrared feature. An FSFAA is also designed to fully fuse and reuse an optimized multi-scale infrared feature. In addition, a simple EFFM is proposed to adaptively fuse a multi-scale feature at a decoder. A parameter quantity of the network is only 5.6 M, required floating-point operations per second (FLOPS) are only 652 M, a frame rate can reach 26.5 fps, average pixel accuracy can reach 88.6%, and average intersection over union can reach 78.5%, which meet a requirement of efficiently and accurately detecting and segmenting an infrared saliency object on the edge computing platform.

4. Based on detection, positioning, and segmentation results of the infrared saliency object, a real-time and efficient process for selecting grasping points of the to-be-grasped target and estimating a pose of the to-be-grasped target is provided to obtain coordinate mapping and motion planning parameters of the to-be-grasped target. This avoids a complex 6D pose estimation method, simplifies a pose estimation process of the to-be-grasped target, and improves real-time performance of the system. In a testing phase, the entire method and apparatus achieve an average grasping time of 2.69 s, a pose estimation accuracy rate of 93% for the to-be-grasped target, and an automatic grasping success rate of 91%. A requirement that a specialized robot working in smoke, combustion, and explosion environments perform pose estimation and automatic grasping of the to-be-grasped target based on the monocular infrared thermally-imaged image.

Embodiment 2

Figure 10:
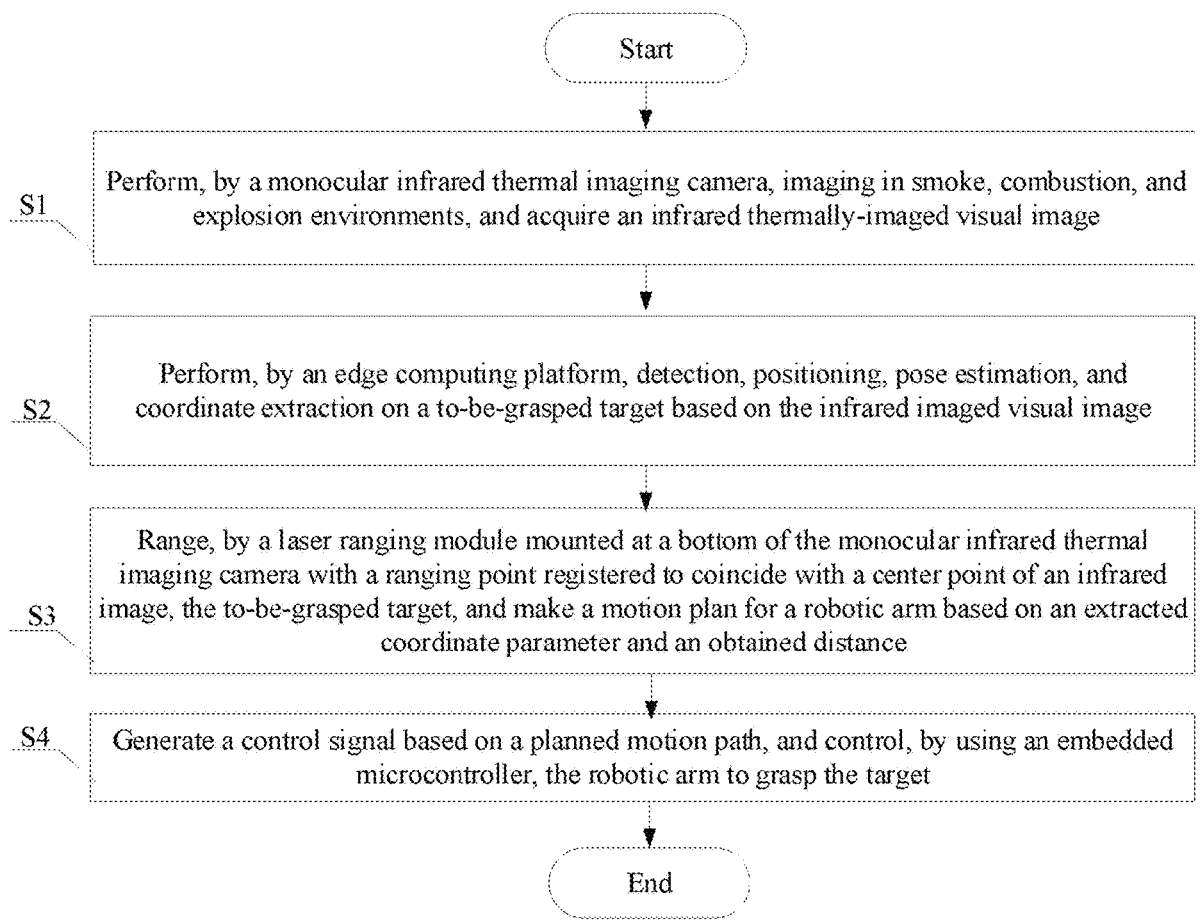
FIG. 10 is a flowchart of a method according to the present disclosure.

As shown in FIG. 10, the present disclosure provides an estimation method for a pose estimation apparatus for a robotic arm to grasp a target based on monocular infrared thermal imaging vision, where the pose estimation apparatus is mounted on a robotic arm loaded on a specialized robot working in smoke, combustion, and explosion environments, and the estimation method includes following steps:

S1: A monocular infrared thermal imaging camera performs imaging in the smoke, combustion, and explosion environments, and acquires an infrared thermally-imaged visual image.

S2: An edge computing platform performs detection, positioning, pose estimation, and coordinate parameter extraction on a to-be-grasped target based on an infrared imaged visual image.

S3: A laser ranging module mounted at a bottom of the monocular infrared thermal imaging camera and having a ranging point registered to coincide with a center point of an infrared image ranges the to-be-grasped target, and makes a motion plan for the robotic arm based on the extracted coordinate parameter and an obtained distance.

S4: A control signal is generated based on a planned motion path, and an embedded microcontroller controls the robotic arm to grasp the target.

The estimation method provided in the embodiment shown in FIG. 10 may execute the technical solutions shown in the estimation apparatus in the foregoing apparatus embodiment, and an implementation principle and a beneficial effect thereof are similar, and are not described herein again.

Those skilled in the art should be easily aware that, in combination with the various schematic units and algorithm steps described in the disclosed embodiments of the present disclosure, the present disclosure can be implemented in a form of hardware and/or a combination of hardware and computer software. Whether a function is performed by hardware or driven by computer software depends on particular applications and design constraints of the technical solutions. Different methods may be used to implement the described functions for each specific application, but such implementation should not be considered to be beyond the scope of the present disclosure.

What is claimed is:

1. A pose estimation apparatus for a robotic arm to grasp a target based on monocular infrared thermal imaging vision, wherein the pose estimation apparatus is mounted on a robotic arm loaded on a specialized robot working in smoke, combustion, and explosion environments, and the pose estimation apparatus comprises:

a monocular infrared thermal imaging camera configured to perform imaging in the smoke, combustion, and explosion environments, and acquire an infrared thermally-imaged visual image;

a laser ranging module mounted at a bottom of the monocular infrared thermal imaging camera, having a ranging point registered to coincide with a center point of the infrared image, and configured to range a to-be-grasped target;

an edge computing platform configured to perform detection, positioning, pose estimation, and coordinate parameter extraction on the to-be-grasped target based on the infrared imaged visual image and a ranging result, and plan a motion path of the robotic arm; and an embedded microcontroller configured to generate a control signal based on the planned motion path to control the robotic arm to grasp the target;

wherein the edge computing platform comprises:

a marking submodule configured to mark a lense of the monocular infrared thermal imaging camera and a hand/arm of the robotic arm, and determine a position coordinate relationship between the monocular infrared thermal imaging camera and a holder of the robotic arm;

a target detection submodule configured to detect, position, and segment, by using an infrared energy distribution attention infrared saliency object detection net (IEDA-detection net) based on the position coordinate relationship, graspable infrared saliency objects in front of the robotic arm to obtain a plurality of infrared saliency object detection results;

a target selection submodule configured to select the to-be-grasped target based on the plurality of infrared saliency object detection results;

a coordinate extraction submodule configured to estimate a target pose based on the to-be-grasped target, and obtain a coordinate relationship between the to-be-grasped target and the monocular infrared camera; and a motion planning submodule configured to make, based on the obtained coordinate relationship and the ranging result, a motion plan for the robotic arm to grasp the target;

wherein the IEDA-detection net comprises an encoder and a decoder;

the encoder is divided into four feature extraction stages: a first feature extraction stage, a second feature extraction stage, a third feature extraction stage, and a fourth feature extraction stage, and extracts four infrared feature maps with different scales and receptive fields by using a feature map downsampling mechanism; and in the encoder and the decoder in each feature extraction stage, an infrared energy distribution enhancement attention module (IEDEAM) is added to enhance an extracted infrared feature to obtain an infrared energy distribution attention enhancement feature map, and a full-scale aggregation architecture is configured to perform multi-scale reuse on an enhanced infrared feature map input into the decoder;

the decoder adopts four feature fusion modules, namely, a first feature fusion module, a second feature fusion module, a third feature fusion module, and a fourth feature fusion module, to fuse a multi-scale enhanced infrared feature map, and restores resolution of the feature map by using a stepwise upsampling mechanism, to obtain the plurality of infrared saliency object detection results; and an expression for fusing the multi-scale enhanced infrared feature map is as follows:

$$Ff_i' = \begin{cases} \text{Fused}(Fe_i', Sj(Fe_j)) & i' = 1, j = 2, 3, 4 \\ \text{Fused}(Fe_i', Dr(Fe_r), Sj(Fe_j)) & i' = 2, r = 1, j = 3, 4; i' = 3, r = 1, 2, j = 4 \\ \text{Fused}(Fe_i', Dr(Fe_r)) & i' = 4, r = 1, 2, 3 \end{cases}$$

wherein $Ff_i'$ represents a multi-scale fused feature map in an $i'^{th}$ stage of the decoder, $i' \in [1 \ldots 4]$, Fused($\cdot$) represents a fusion operation of the fusion module in the decoder, $Fe_i'$, $Fe_j$ and $Fe_r$ respectively represent infrared energy distribution attention enhancement feature maps in the $i'^{th}$ stage, an $r^{th}$ stage, and a $j^{th}$ stage, $i'$, $r$, $j \in [1 \ldots 4]$, $Sj(\cdot)$ represents an upsampling operation in the $j^{th}$ stage, and $Dr(\cdot)$ represents a down-sampling operation in the $r^{th}$ stage.

2. The pose estimation apparatus for the robotic arm to grasp the target based on the monocular infrared thermal imaging vision according to claim 1, wherein the first feature extraction stage comprises two first residual blocks and a second residual block, one of the two first residual blocks has a kernel size of 3 and 2 strides and the other one has a kernel size of 3 and 1 stride, and the second residual block is provided with a squeeze and excitation module (SEM);

the second feature extraction stage comprises a third residual block having a kernel size of 3 and 1 stride, and a fourth residual block having a kernel size of 5 and 2 strides, and the fourth residual block is provided with a SEM;

the third feature extraction stage comprises two fifth residual blocks with each having a kernel size of 3 and 1 stride, and a sixth residual block having a kernel size of 5 and 2 strides, and both the fifth residual block and the sixth residual block are provided with a SEM; and the fourth feature extraction stage comprises five seventh residual blocks with each having a kernel size of 3 and 1 stride, and an eighth residual block having a kernel size of 5 and 2 strides, and both the seventh residual block and the eighth residual block are provided with a SEM.

3. The pose estimation apparatus for the robotic arm to grasp the target based on the monocular infrared thermal imaging vision according to claim 2, wherein the IEDEAM comprises:

a wavelet transform-specific feature energy distribution coefficient calculation subunit configured to perform wavelet transform on the extracted infrared feature map to obtain a low-frequency component feature map, a horizontal high-frequency component feature map, a vertical high-frequency component feature map, and a diagonal high-frequency component feature map of the infrared feature map, and calculate an infrared energy distribution coefficient based on the low-frequency component feature map, the horizontal high-frequency component feature map, the vertical high-frequency component feature map, and the diagonal high-frequency component feature map, wherein expressions of the low-frequency component feature map, the horizontal high-frequency component feature map, the vertical high-frequency component feature map, and the diagonal high-frequency component feature map are as follows:

$$FL_i = dwt2\_L(F_i)$$

$$FH_i = dwt2\_H(F_i)$$

$$FV_i = dwt2\_V(F_i)$$

$$FD_i = dwt2\_D(F_i)$$

wherein $FL_i$ represents a low-frequency component of wavelet transform for a feature map of an $i^{th}$ channel, $dwt2\_L$ represents an operation of extracting a low-frequency component for 2D wavelet transform by taking an Haar operator as a wavelet base, $F_i$ represents the feature map of the $i^{th}$ channel, $FH_i$ represents a horizontal high-frequency component of the wavelet transform for the feature map of the $i^{th}$ channel, dwt2_H represents an operation of extracting a horizontal high-frequency component for the 2D wavelet transform by taking the Haar operator as the wavelet base, FVi represents a vertical high-frequency component of the wavelet transform for the feature map of the $i^{th}$ channel, dwt2_V represents an operation of extracting a vertical high-frequency component for the 2D wavelet transform by taking the Haar operator as the wavelet base, FDi represents a diagonal high-frequency component of the wavelet transform for the feature map of the $i^{th}$ channel, and dwt2_D represents an operation of extracting a diagonal high-frequency component for the 2D wavelet transform by taking the Haar operator as the wavelet base; and an expression of the infrared energy distribution coefficient is as follows:

$$W = \text{Norm}\left(\sum_{i=1}^{N} \text{Sum}(FLi + FHi + FVi + FDi)/N\right)$$

$$WL = \frac{\text{Norm}\left(\sum_{i=1}^{N} \text{Sum}(FLi)/N\right)}{W}$$

$$WH = \frac{\text{Norm}\left(\sum_{i=1}^{N} \text{Sum}(FHi)/N\right)}{W}$$

$$WV = \frac{\text{Norm}\left(\sum_{i=1}^{N} \text{Sum}(FVi)/N\right)}{W}$$

$$WD = \frac{\text{Norm}\left(\sum_{i=1}^{N} \text{Sum}(FDi)/N\right)}{W}$$

wherein W represents total energy of the feature map on the wavelet transform components, Norm(·) represents a normalization operation, N represents a quantity of feature channels, Sum(·) represents pixel summation, and WL, WH, WV, and WD respectively represent infrared energy distribution coefficients of the low-frequency, horizontal, vertical, and diagonal components; and an infrared feature map enhancement and reconstruction subunit configured to enhance and reconstruct the infrared feature map based on the infrared energy distribution coefficient to obtain the infrared energy distribution attention enhancement feature map:

$Fe=RelU(FdwR+Fc)$ $FdwR=Idwt2(1\times1Conv(ReLU(1\times1Conv(WL\otimes FL, WH\otimes FH, WV\otimes FV, WD\otimes FD))))$ $Fc=1\times1Conv(ReLU(1\times1Conv(F)))$ wherein Fe represents the infrared energy distribution attention enhancement feature map, RelU represents a ReLU activation function, FdwR represents a wavelet-reconstructed infrared feature map, Fc represents an original infrared feature map processed by a convolutional layer and an activation function, FL, FH, FV, and FD respectively represent wavelet-transformed infrared feature maps of the low-frequency, horizontal, vertical, and diagonal components, 1×1Conv represents a convolutional layer having one convolution kernel and one stride, and Idwt2 represents inverse 2D wavelet transform by taking the Haar operator as the wavelet base.

4. The pose estimation apparatus for the robotic arm to grasp the target based on the monocular infrared thermal imaging vision according to claim 3, wherein the feature fusion modules have a same structure, and each of the feature fusion modules comprises an input terminal, a splicing path and an accumulation path that are separately connected to the input terminal, a ReLU activation function layer separately connected to the splicing path and the accumulation path, and an output terminal connected to the ReLU activation function layer;

the input terminal is configured to receive infrared energy distribution attention enhancement features of four scales;

the splicing path is configured to correspond a channel quantity of an output fused feature map to a feature channel extracted by the encoder in a corresponding stage, and represent a fused feature obtained by the splicing path as a global semantic feature, wherein the splicing path comprises a splicing layer, two convolutional layers with each having a kernel size of 3 and 1 stride, two batch normalization layers, and one ReLU activation function;

the accumulation path is configured to: adjust a channel quantity of the feature map to a channel quantity of an infrared feature extracted by the encoder in the corresponding stage, correspond the channel quantity of the output fused feature map to the feature channel extracted by the encoder in the corresponding stage, and use a fused feature obtained by the accumulation path to represent a local detail feature;

the ReLU activation function layer is configured to add the fused feature obtained by the splicing path and the fused feature obtained by the accumulation path to obtain an adaptively fused feature:

$Ff = ReLU(Fcat + Facc)$ $Fcat = BN(3\times3Conv(ReLU(BN(3\times3Conv(Fin(n))))))$ $$Facc = BN\left(3\times3Conv\left(\sum_{i=1}^{n=4} 3\times3Conv(Fin(n))\right)\right)$$

wherein Ff represents the adaptively fused feature, ReLU(·) represents the ReLU activation function, Fcat represents the fused feature obtained by the splicing path, Facc represents the fused feature obtained by the accumulation path, BN(·) represents a batch normalization operation, 3×3Conv represents a convolution operation having a kernel size of 3 and 1 stride, Fin(n) represents input infrared energy distribution attention enhancement features of n scales, and n=4; and an output layer is configured to output a fused multi-scale enhanced infrared feature map based on the adaptively fused feature.

5. The pose estimation apparatus for the robotic arm to grasp the target based on the monocular infrared thermal imaging vision according to claim 1, wherein the target selection submodule comprises:

a first determining unit configured to determine, based on the plurality of infrared saliency object detection results, that it is set to manually specify the to-be-grasped target, and manually select the to-be-grasped target;

a second determining unit configured to determine, based on the plurality of infrared saliency object detection results, that it is set to automatically select the to-be-grasped target, measure a saliency region obtained through segmentation, select a target with a highest regional temperature, and grasp the target; and a third determining unit configured to determine whether there is an obstruction in front of the to-be-grasped target, and grasp the obstruction, place the obstruction aside, and select the to-be-grasped target if there is the obstruction in front of the to-be-grasped target, or directly select the to-be-grasped target if there is no obstruction in front of the to-be-grasped target.

6. The pose estimation apparatus for the robotic arm to grasp the target based on the monocular infrared thermal imaging vision according to claim 1, wherein the coordinate extraction submodule comprises:

a centroid determining unit for the to-be-grasped target configured to determine a centroid of the to-be-grasped target based on the to-be-grasped target, and use the centroid of the to-be-grasped target as a center point to make perpendicular lines intersecting in vertical and horizontal directions; and a grasping point determining unit configured to rotate the perpendicular lines, calculate a distance from the perpendicular line in the horizontal direction to a segmented edge, and select two edge points with a smallest distance as target grasping points to obtain the coordinate relationship between the to-be-grasped target and the infrared camera; wherein the target grasping point is expressed as follows:

$$Dx\ min=Min(Dx(\theta))\ \theta\in(0,360)$$

$$Gl(x,y)=(xl,yl)Dx=Dx\ min$$

$$Gr(x,y)=(xr,yr)Dx=Dx\ min$$

wherein Dxmin represents a minimum distance between the centroid of the to-be-grasped target on the perpendicular line in the horizontal direction and two edge points in the horizontal direction, Min(·) represents a minimum value operation, $Dx(\theta)$ represents a distance between the centroid of the to-be-grasped target on the perpendicular line in the horizontal direction and the two edge points in the horizontal direction during each rotation based on an angle $\theta$, Gl(x, y) and Gr(x, y) respectively represent left and right grasping points of the to-be-grasped target, (xl, yl) and (xr, yr) respectively represent coordinates of the left and right grasping points of the to-be-grasped target, and Dx represents a distance between the centroid on the perpendicular line in the horizontal direction and the two edge points in the horizontal direction; and in a process of rotating the to-be-grasped target based on the angle $\theta$, when the distance Dx between the two edge points in the horizontal direction and the centroid on the perpendicular line in the horizontal direction between the left and right grasping points (Gl(x, y) and Gr(x, y)) reaches Dxmin, the coordinates (xl, yl) of the left grasping point and the coordinates (xr, yr) of the right grasping point are determined as the coordinates of the two grasping points of the to-be-grasped target.

7. The pose estimation apparatus for the robotic arm to grasp the target based on the monocular infrared thermal imaging vision according to claim 6, wherein the coordinate extraction submodule comprises:

a plane rotation angle parameter obtaining unit configured to establish plane coordinates based on the to-be-grasped target and a center point (x0, y0) of an image of the monocular infrared thermal imaging camera, and calculate a difference between the center point of the plane coordinates and coordinates (xs, ys) of the centroid of the to-be-grasped target to obtain a plane rotation angle parameter:

$$Xt=x0-xs$$

$$Yt=y0-ys$$

wherein when Xt is a negative number, it indicates that a position of the to-be-grasped target deviates to right relative to the center point of the infrared thermal imaging camera, and the robotic arm needs to translate right by |Xt| pixels; when Xl is a positive number, it indicates that the position of the to-be-grasped target deviates to left relative to the center point of the infrared thermal imaging camera, and the robotic arm needs to translate left by |Xt| pixels; when Yt is a negative number, it indicates that the position of the to-be-grasped target deviates upwards relative to the center point of the infrared thermal imaging camera, and the robotic arm needs to translate upwards by |Yt| pixels; and when Yt is a positive number, it indicates that the position of the to-be-grasped target deviates downwards relative to the center point of the infrared thermal imaging camera, and the robotic arm needs to translate downwards by |Yt| pixels;

a first alignment unit configured to make the coordinates of the centroid of the to-be-grasped target coincide with coordinates of a center of the image of the infrared camera based on the plane rotation angle parameter, so as to align a plane position of the robotic arm with the to-be-grasped target;

a polar coordinate rotation angle parameter calculation unit configured to align the plane position of the robotic arm with the to-be-grasped target, establish first polar coordinates based on the center ($\theta$, R) of the image of the monocular infrared thermal imaging camera, establish second polar coordinates ($\theta$s, Rs) based on the centroid of the to-be-grasped target and the grasping point, and calculate a difference between angles of the first and second polar coordinates to obtain a polar coordinate rotation angle parameter $\theta$t:

$$\theta t=\theta 0-\theta s$$

wherein when $\theta$t is a negative number, it indicates that the holder of the robotic arm needs to rotate counterclockwise by |$\theta$t| degrees; when $\theta$t is a positive number, it indicates that the holder of the robotic arm needs to rotate clockwise by |$\theta$t| degrees; $\theta$0 represents a current angle of the first polar coordinates; and $\theta$s represents a current angle of the second polar coordinates; and a second alignment unit configured to align a grasping angle of the holder of the robotic arm with the grasping point of the to-be-grasped target based on the polar coordinate rotation angle parameter $\theta$t to obtain the coordinate relationship between the to-be-grasped target and the infrared camera.

8. An estimation method for the pose estimation apparatus for the robotic arm to grasp the target based on the monocular infrared thermal imaging vision according to claim 1, wherein the pose estimation apparatus is mounted on the robotic arm loaded on the specialized robot working in the smoke, combustion, and explosion environments, and the estimation method comprises following steps:
- S1: performing, by the monocular infrared thermal imaging camera, imaging in the smoke, combustion, and explosion environments, and acquiring the infrared thermally-imaged visual image;
- S2: performing, by the edge computing platform, the detection, the positioning, the pose estimation, and the coordinate parameter extraction on the to-be-grasped target based on the infrared imaged visual image;
- S3: ranging, by the laser ranging module mounted at the bottom of the monocular infrared thermal imaging camera and having the ranging point registered to coincide with the center point of the infrared image, the to-be-grasped target, and making the motion plan for the robotic arm based on the extracted coordinate parameter and an obtained distance; and
- S4: generating the control signal based on the planned motion path, and controlling, by using the embedded microcontroller, the robotic arm to grasp the target.

9. The estimation method according to claim 8, wherein in the pose estimation apparatus, the first feature extraction stage comprises two first residual blocks and a second residual block, one of the two first residual blocks has a kernel size of 3 and 2 strides and the other one has a kernel size of 3 and 1 stride, and the second residual block is provided with a squeeze and excitation module (SEM);
the second feature extraction stage comprises a third residual block having a kernel size of 3 and 1 stride, and a fourth residual block having a kernel size of 5 and 2 strides, and the fourth residual block is provided with a SEM;
the third feature extraction stage comprises two fifth residual blocks with each having a kernel size of 3 and 1 stride, and a sixth residual block having a kernel size of 5 and 2 strides, and both the fifth residual block and the sixth residual block are provided with a SEM; and
the fourth feature extraction stage comprises five seventh residual blocks with each having a kernel size of 3 and 1 stride, and an eighth residual block having a kernel size of 5 and 2 strides, and both the seventh residual block and the eighth residual block are provided with a SEM.

10. The estimation method according to claim 9, wherein in the pose estimation apparatus, the IEDEAM comprises:
a wavelet transform-specific feature energy distribution coefficient calculation subunit configured to perform wavelet transform on the extracted infrared feature map to obtain a low-frequency component feature map, a horizontal high-frequency component feature map, a vertical high-frequency component feature map, and a diagonal high-frequency component feature map of the infrared feature map, and calculate an infrared energy distribution coefficient based on the low-frequency component feature map, the horizontal high-frequency component feature map, the vertical high-frequency component feature map, and the diagonal high-frequency component feature map, wherein
expressions of the low-frequency component feature map, the horizontal high-frequency component feature map, the vertical high-frequency component feature map, and the diagonal high-frequency component feature map are as follows:

$$FLi = dwt2\_L(Fi)$$

$$FHi = dwt2\_H(Fi)$$

$$FVi = dwt2\_V(Fi)$$

$$FDi = dwt2\_D(Fi)$$

wherein FLi represents a low-frequency component of wavelet transform for a feature map of an $i^{th}$ channel, dwt2_L represents an operation of extracting a low-frequency component for 2D wavelet transform by taking an Haar operator as a wavelet base, Fi represents the feature map of the $i^{th}$ channel, FHi represents a horizontal high-frequency component of the wavelet transform for the feature map of the $i^{th}$ channel, dwt2_H represents an operation of extracting a horizontal high-frequency component for the 2D wavelet transform by taking the Haar operator as the wavelet base, FVi represents a vertical high-frequency component of the wavelet transform for the feature map of the $i^{th}$ channel, dwt2_V represents an operation of extracting a vertical high-frequency component for the 2D wavelet transform by taking the Haar operator as the wavelet base, FDi represents a diagonal high-frequency component of the wavelet transform for the feature map of the $i^{th}$ channel, and dwt2_D represents an operation of extracting a diagonal high-frequency component for the 2D wavelet transform by taking the Haar operator as the wavelet base; and an expression of the infrared energy distribution coefficient is as follows:

$$W = \mathrm{Norm}\left(\sum_{i=1}^{N} \mathrm{Sum}(FLi + FHi + FVi + FDi)/N\right)$$

$$WL = \frac{\mathrm{Norm}\left(\sum_{i=1}^{N} \mathrm{Sum}(FLi)/N\right)}{W}$$

$$WH = \frac{\mathrm{Norm}\left(\sum_{i=1}^{N} \mathrm{Sum}(FHi)/N\right)}{W}$$

$$WV = \frac{\mathrm{Norm}\left(\sum_{i=1}^{N} \mathrm{Sum}(FVi)/N\right)}{W}$$

$$WD = \frac{\mathrm{Norm}\left(\sum_{i=1}^{N} \mathrm{Sum}(FDi)/N\right)}{W}$$

wherein W represents total energy of the feature map on the wavelet transform components, Norm(·) represents a normalization operation, N represents a quantity of feature channels, Sum(·) represents pixel summation, and WL, WH, WV, and WD respectively represent infrared energy distribution coefficients of the low-frequency, horizontal, vertical, and diagonal components; and an infrared feature map enhancement and reconstruction subunit configured to enhance and reconstruct the infrared feature map based on the infrared energy distribution coefficient to obtain the infrared energy distribution attention enhancement feature map:

$$Fe = RelU(FdwR + Fc)$$

$$FdwR = Idwt2(1 \times 1 Conv(ReLU(1 \times 1 Conv(WL \otimes FL, WH \otimes FH, WV \otimes FV, WD \otimes FD))))$$

$$Fc = 1 \times 1 Conv(ReLU(1 \times 1 Conv(F)))$$

wherein Fe represents the infrared energy distribution attention enhancement feature map, RelU represents a ReLU activation function, FdwR represents a wavelet-reconstructed infrared feature map, Fc represents an original infrared feature map processed by a convolutional layer and an activation function, FL, FH, FV, and FD respectively represent wavelet-transformed infrared feature maps of the low-frequency, horizontal, vertical, and diagonal components, 1×1Conv represents a convolutional layer having one convolution kernel and one stride, and Idwt2 represents inverse 2D wavelet transform by taking the Haar operator as the wavelet base.

11. The estimation method according to claim 10, wherein in the pose estimation apparatus, the feature fusion modules have a same structure, and each of the feature fusion modules comprises an input terminal, a splicing path and an accumulation path that are separately connected to the input terminal, a ReLU activation function layer separately connected to the splicing path and the accumulation path, and an output terminal connected to the ReLU activation function layer;
the input terminal is configured to receive infrared energy distribution attention enhancement features of four scales;
the splicing path is configured to correspond a channel quantity of an output fused feature map to a feature channel extracted by the encoder in a corresponding stage, and represent a fused feature obtained by the splicing path as a global semantic feature, wherein the splicing path comprises a splicing layer, two convolutional layers with each having a kernel size of 3 and 1 stride, two batch normalization layers, and one ReLU activation function;
the accumulation path is configured to: adjust a channel quantity of the feature map to a channel quantity of an infrared feature extracted by the encoder in the corresponding stage, correspond the channel quantity of the output fused feature map to the feature channel extracted by the encoder in the corresponding stage, and use a fused feature obtained by the accumulation path to represent a local detail feature;
the ReLU activation function layer is configured to add the fused feature obtained by the splicing path and the fused feature obtained by the accumulation path to obtain an adaptively fused feature:

$$Ff = ReLU(Fcat + Facc)$$

$$Fcat = BN(3 \times 3Conv(ReLU(BN(3 \times 3Conv(Fin(n))))))$$

$$Facc = BN\left(3 \times 3Conv\left(\sum_{i=1}^{n=4} 3 \times 3Conv(Fin(n))\right)\right)$$

wherein Ff represents the adaptively fused feature, ReLU (·) represents the ReLU activation function, Fcat represents the fused feature obtained by the splicing path, Facc represents the fused feature obtained by the accumulation path, BN(·) represents a batch normalization operation, 3×3Conv represents a convolution operation having a kernel size of 3 and 1 stride, Fin(n) represents input infrared energy distribution attention enhancement features of n scales, and n=4; and
an output layer is configured to output a fused multi-scale enhanced infrared feature map based on the adaptively fused feature.

12. The estimation method according to claim 8, wherein in the pose estimation apparatus, the target selection submodule comprises:
a first determining unit configured to determine, based on the plurality of infrared saliency object detection results, that it is set to manually specify the to-be-grasped target, and manually select the to-be-grasped target;
a second determining unit configured to determine, based on the plurality of infrared saliency object detection results, that it is set to automatically select the to-be-grasped target, measure a saliency region obtained through segmentation, select a target with a highest regional temperature, and grasp the target; and
a third determining unit configured to determine whether there is an obstruction in front of the to-be-grasped target, and grasp the obstruction, place the obstruction aside, and select the to-be-grasped target if there is the obstruction in front of the to-be-grasped target, or directly select the to-be-grasped target if there is no obstruction in front of the to-be-grasped target.

13. The estimation method according to claim 8, wherein in the pose estimation apparatus, the coordinate extraction submodule comprises:
a centroid determining unit for the to-be-grasped target configured to determine a centroid of the to-be-grasped target based on the to-be-grasped target, and use the centroid of the to-be-grasped target as a center point to make perpendicular lines intersecting in vertical and horizontal directions; and
a grasping point determining unit configured to rotate the perpendicular lines, calculate a distance from the perpendicular line in the horizontal direction to a segmented edge, and select two edge points with a smallest distance as target grasping points to obtain the coordinate relationship between the to-be-grasped target and the infrared camera; wherein
the target grasping point is expressed as follows:

$$Dx\ min = Min(Dx(\theta))\ \theta \in (0,360)$$

$$Gl(x,y) = (xl,yl) Dx = Dx\ min$$

$$Gr(x,y) = (xr,yr) Dx = Dx\ min$$

wherein Dxmin represents a minimum distance between the centroid of the to-be-grasped target on the perpendicular line in the horizontal direction and two edge points in the horizontal direction, Min(·) represents a minimum value operation, Dx(θ) represents a distance between the centroid of the to-be-grasped target on the perpendicular line in the horizontal direction and the two edge points in the horizontal direction during each rotation based on an angle θ, Gl(x, y) and Gr(x, y) respectively represent left and right grasping points of the to-be-grasped target, (xl, yl) and (xr, yr) respectively represent coordinates of the left and right grasping points of the to-be-grasped target, and Dx represents a distance between the centroid on the perpendicular line in the horizontal direction and the two edge points in the horizontal direction; and
in a process of rotating the to-be-grasped target based on the angle θ, when the distance Dx between the two edge points in the horizontal direction and the centroid on the perpendicular line in the horizontal direction between the left and right grasping points (Gl(x, y) and Gr(x, y)) reaches Dxmin, the coordinates (xl, yl) of the left grasping point and the coordinates (xr, yr) of the right grasping point are determined as the coordinates of the two grasping points of the to-be-grasped target.

14. The estimation method according to claim 13, wherein in the pose estimation apparatus, the coordinate extraction submodule comprises:
a plane rotation angle parameter obtaining unit configured to establish plane coordinates based on the to-be-grasped target and a center point (x0, y0) of an image of the monocular infrared thermal imaging camera, and calculate a difference between the center point of the plane coordinates and coordinates (xs, ys) of the centroid of the to-be-grasped target to obtain a plane rotation angle parameter:

$$Xt = x0 - xs$$

$$Yt = y0 - ys$$

wherein when Xt is a negative number, it indicates that a position of the to-be-grasped target deviates to right relative to the center point of the infrared thermal imaging camera, and the robotic arm needs to translate right by |Xt| pixels; when Xt is a positive number, it indicates that the position of the to-be-grasped target deviates to left relative to the center point of the infrared thermal imaging camera, and the robotic arm needs to translate left by |Xt| pixels; when Yt is a negative number, it indicates that the position of the to-be-grasped target deviates upwards relative to the center point of the infrared thermal imaging camera, and the robotic arm needs to translate upwards by |Yt| pixels; and when Yt is a positive number, it indicates that the position of the to-be-grasped target deviates downwards relative to the center point of the infrared thermal imaging camera, and the robotic arm needs to translate downwards by |Yt| pixels;

a first alignment unit configured to make the coordinates of the centroid of the to-be-grasped target coincide with coordinates of a center of the image of the infrared camera based on the plane rotation angle parameter, so as to align a plane position of the robotic arm with the to-be-grasped target;

a polar coordinate rotation angle parameter calculation unit configured to align the plane position of the robotic arm with the to-be-grasped target, establish first polar coordinates based on the center (θ, R) of the image of the monocular infrared thermal imaging camera, establish second polar coordinates (θs, Rs) based on the centroid of the to-be-grasped target and the grasping point, and calculate a difference between angles of the first and second polar coordinates to obtain a polar coordinate rotation angle parameter θt:

$$\theta t = \theta 0 - \theta s$$

wherein when θt is a negative number, it indicates that the holder of the robotic arm needs to rotate counterclockwise by |θt| degrees; when θt is a positive number, it indicates that the holder of the robotic arm needs to rotate clockwise by |θt| degrees; θ0 represents a current angle of the first polar coordinates; and θs represents a current angle of the second polar coordinates; and a second alignment unit configured to align a grasping angle of the holder of the robotic arm with the grasping point of the to-be-grasped target based on the polar coordinate rotation angle parameter θt to obtain the coordinate relationship between the to-be-grasped target and the infrared camera.

\* \* \* \* \*